US010949024B2

(12) United States Patent
Haroun et al.

(10) Patent No.: US 10,949,024 B2
(45) Date of Patent: Mar. 16, 2021

(54) TOUCH SCREEN

(71) Applicant: TEXAS INSTRUMENTS INCORPORATED, Dallas, TX (US)

(72) Inventors: Baher S. Haroun, Allen, TX (US); Marco Corsi, Allen, TX (US); Brian P. Ginsburg, Allen, TX (US); Vijay B. Rentala, Plano, TX (US); Srinath M. Ramaswamy, Murphy, TX (US); Eunyoung Seok, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/981,688

(22) Filed: May 16, 2018

(65) Prior Publication Data

US 2018/0321795 A1 Nov. 8, 2018

Related U.S. Application Data

(63) Continuation of application No. 13/158,010, filed on Jun. 10, 2011, now abandoned.

(51) Int. Cl.
*G06F 3/042* (2006.01)
*G06F 3/046* (2006.01)

(52) U.S. Cl.
CPC ............ *G06F 3/0421* (2013.01); *G06F 3/046* (2013.01); *G06F 2203/04109* (2013.01)

(58) Field of Classification Search
CPC ...... G06F 3/0421; G06F 3/946; G06F 3/0423; G06F 3/0412; G06F 3/0428; G06F 2203/04109; G06F 3/046
See application file for complete search history.

(56) References Cited

U.S. PATENT DOCUMENTS

| 3,673,327 | A | 6/1972 | Johnson et al. |
| 2005/0248540 | A1 | 11/2005 | Newton |
| 2007/0025739 | A1 | 2/2007 | Moore et al. |
| 2007/0070358 | A1 | 3/2007 | Ouchi |
| 2009/0009408 | A1 | 1/2009 | Rofougaran |

(Continued)

FOREIGN PATENT DOCUMENTS

| JP | 2006518076 | 8/2006 |
| KR | 20100129015 | 12/2010 |
| WO | 2008068607 | 6/2008 |

(Continued)

OTHER PUBLICATIONS

"Injection-Locked Oscillators with High-Order-Division Operation for Microwave/Millimeter-wave Signal Generation," Dissertation, Oct. 9, 2007 (Huang).

(Continued)

*Primary Examiner* — Jimmy H Nguyen
(74) *Attorney, Agent, or Firm* — Michael A. Davis, Jr.; Charles A. Brill; Frank D. Cimino

(57) ABSTRACT

A pulse of terahertz radiation is transmitted through a touch panel formed of a dielectric material. The pulse generates an employable evanescent field in a region adjacent to a touch surface of the touch panel. The terahertz radiation has a frequency range between 0.1 terahertz and 10 terahertz. A reflected pulse is generated from an object located within the region adjacent to the touch surface of the touch panel. A position is triangulated of the object on the touch surface of the touch panel, based at least in part on the reflected pulse.

19 Claims, 18 Drawing Sheets

(56) References Cited

U.S. PATENT DOCUMENTS

2010/0193259 A1     8/2010    Wassvik

FOREIGN PATENT DOCUMENTS

| WO | 2009028718 | | 3/2009 |
|---|---|---|---|
| WO | 2009029767 | | 3/2009 |
| WO | 2011028169 | A1 | 3/2011 |

OTHER PUBLICATIONS

European Search Report for EU 12797092.9 dated Oct. 10, 2018; 7 pages.
"Filling the THz Gap—High Power Sources and Applications," Institute of Physics Publishing, Reports on Progress in Physics, 2006, doi:10.1088/0034-4885/69/2/R01, pp. 301-326 (Gwyn P Williams).
"Low-Power mm-Wave Components up to 104GHz in 90nm CMOS," ISSCC 2007, Feb. 2007, San Francisco, CA, pp. 200-201 (Heydari, B.; Bohsali, M.; Adabi, E.; Niknejad, A.M.).
"Millimeter-Wave CMOS Digital Controlled Artificial Dielectric Differential Mode Transmission Lines for Reconfigurable ICs," IEEE MTT-S IMS, 2008, pp. 181-184 (LaRocca, T.; Sai-Wang Tam; Daquan Huang; Qun Gu; Socher, E.; Hant, W.; Chang, F.).
"A 52 GHz Phased-Array Receiver Front-End in 90 nm Digital CMOS," JSSC Dec. 2008, pp. 2651-2659 (Scheir, K.; Bronckers, S.; Borremans, J.; Wambacq, P.; Rolain, Y).
"A Multi-Path Gated Ring Oscillator TDC With First-Order Noise Shaping," IEEE Journal of Solid-State Circuits, vol. 44, No. 4, Apr. 2009, pp. 1089-1098 (Matthew Z. Straayer and Michael H. Perrott).
"A Bidirectional TX/RX Four element Phased-Array at 60GHz with RF-IF Conversion Block in 90nm CMOS Process," 2009 IEEE Radio Freq. Integrated Circuits Symposium, pp. 207-210 (Cohen, E.; Jakobson, C.; Ravid, S.; Ritter, D.).
"A Millimeter-Wave (40-45 GHz) 16-Element Phased-Array Transmitter in 0.18-um SiGe BiCMOS Technology," IEEE J. of Solid State Circuits, vol. 44, No. 5, May 2009, pp. 1498-1509 (Kwang-Jin Koh; May, J.W.; Rebeiz, G.M.).
"Injection- and Phase-Locking Techniques for Beam Control," IEEE Transactions on Microwave Theory and Techniques, vol. 46, No. 11, Nov. 1998, pp. 1920-1929 (Robert A. York and Tatsuo Itoh).
"An Integrated Subharmonic Coupled-Oscillator Scheme for a 60-GHz Phased-Array Transmitter," IEEE Transactions on Microwave Theory and Techniques, vol. 54, No. 12, Dec. 2006, pp. 4271-4280 (James F. Buckwalter, Aydin Babakhani, Abbas Komijani, and Ali Hajimiri).
A W-band Injection-Locked Frequency Provider Using GaAs pHEMTs and Cascode Circuit Topology, IEEE Microwave and Wireless Components Letters, vol. 17, No. 12, Dec. 2007, pp. 885-887 (Huang, et al.).
International Search Report for PCT/US2012/041826 dated Jan. 3, 2013.
Mittleman, "Total Internal Reflection and the Evanescent Wave", Feb. 2015, http://www.ece.rice.edu/daniel/262/pdf/lecture14.pdf.
European Search Report for EU 12797092.9 dated Oct. 24, 2017.

TOUCH SCREEN

CROSS-REFERENCE TO RELATED APPLICATION

This application is a continuation of U.S. patent application Ser. No. 13/158,010 filed Jun. 10, 2011, which is fully incorporated herein by reference.

BACKGROUND

Touch screens have become ubiquitous, being included in mobile devices (i.e., phones) and other devices (i.e., tablet computers). There is however difficulty in engineering larger displays (such as for "black boards). Resistive and capacitive touch panels for large scale applications can be expensive and "power hungry," while projector based solutions suffer from occlusion. Thus, there is a need for a touch sensitive system that is scalable.

Some examples of conventional circuits and systems are: Williams, "Filling the THz Gap," doi:10.1088/0034-4885/69/2/R01; Heydari et al., "Low-Power mm-Wave Components up to 104 GHz in 90 nm CMOS," ISSCC 2007, pp. 200-201, February 2007, San Francisco, Calif.; LaRocca et al., "Millimeter-Wave CMOS Digital Controlled Artificial Dielectric Differential Mode Transmission Lines for Reconfigurable ICs," IEEE MTT-S IMS, 2008; Scheir et al., "A 52 GHz Phased-Array Receiver Front-End in 90 nm Digital CMOS" JSSC Dec. 2008, pp. 2651-2659; Straayer et al. "A Multi-Path Gated Ring Oscillator TDC With First-Order Noise Shaping," IEEE J. of Solid State Circuits, Vol. 44, No. 4, April 2009, pp. 1089-1098; Huang, "Injection-Locked Oscillators with High-Order-Division Operation for Microwave/Millimeter-wave Signal Generation," Dissertation, Oct. 9, 2007; Cohen et al., "A bidirectional TX/RX four element phased-array at 60 HGz with RF-IF conversion block in 90 nm CMOS processes," 2009 IEEE Radio Freq. Integrated Circuits Symposium, pp. 207-210; Koh et al., "A Millimeter-Wave (40-65 GHz) 16-Element Phased-Array Transmitter in 0.18-μm SiGe BiCMOS Technology," IEEE J. of Solid State Circuits, Vol. 44, No. 5, May 2009, pp. 1498-1509; York et al., "Injection- and Phase-locking Techniques for Beam Control," IEEE Transactions on Microwave Theory and Techniques, Vol. 46, No. 11, November 1998, pp. 1920-1929; Buckwalter et al., "An Integrated Subharmonic Coupled-Oscillator Scheme for a 60-GHz Phased Array Transmitter," IEEE Transactions on Microwave Theory and Techniques, Vol. 54, No. 12, December 2006, pp. 4271-4280; PCT Publ. No. WO2009028718; and U.S. Pat. No. 3,673,327.

SUMMARY

A pulse of terahertz radiation is transmitted through a touch panel formed of a dielectric material. The pulse generates an employable evanescent field in a region adjacent to a touch surface of the touch panel. The terahertz radiation has a frequency range between 0.1 terahertz and 10 terahertz. A reflected pulse is generated from an object located within the region adjacent to the touch surface of the touch panel. A position is triangulated of the object on the touch surface of the touch panel, based at least in part on the reflected pulse.

DETAILED DESCRIPTION OF EXAMPLE EMBODIMENTS

Figure 1:
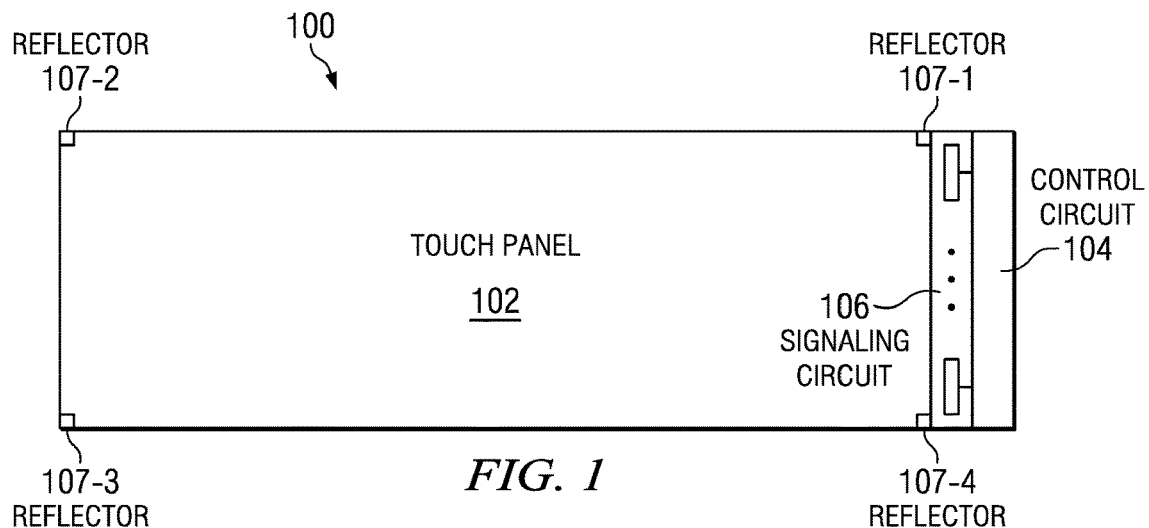
FIG. 1 is an example of touch screen system in accordance with an embodiment.
Figure 2:
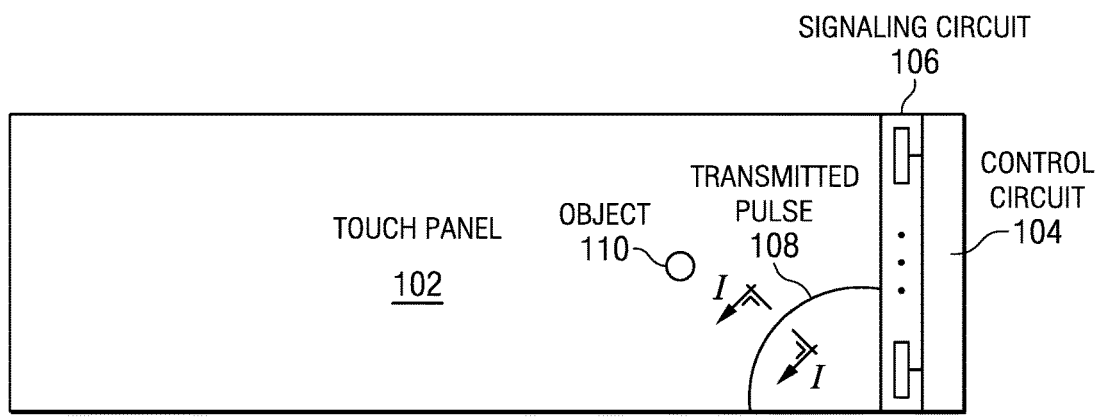
FIG. 2 is diagram an example of a portion of the operation of the system of FIG. 1.

In the drawings, depicted elements are, for the sake of clarity, not necessarily shown to scale, and like or similar elements are designated by the same reference numeral through the several views.

This application incorporated by reference U.S. patent application Ser. No. 12/871,626, entitled "DOWNCONVERSION MIXER," filed on Aug. 30, 2010; U.S. patent application Ser. No. 12/878,484, entitled "TERAHERTZ PHASED ARRAY SYSTEM," filed on Sep. 9, 2010; and U.S. patent application Ser. No. 12/871,626, entitled "ANALOG BASEBAND SYSTEM FOR A TERAHERTZ PHASED ARRAY SYSTEM," filed on Apr. 12, 2011.

Figure 3:
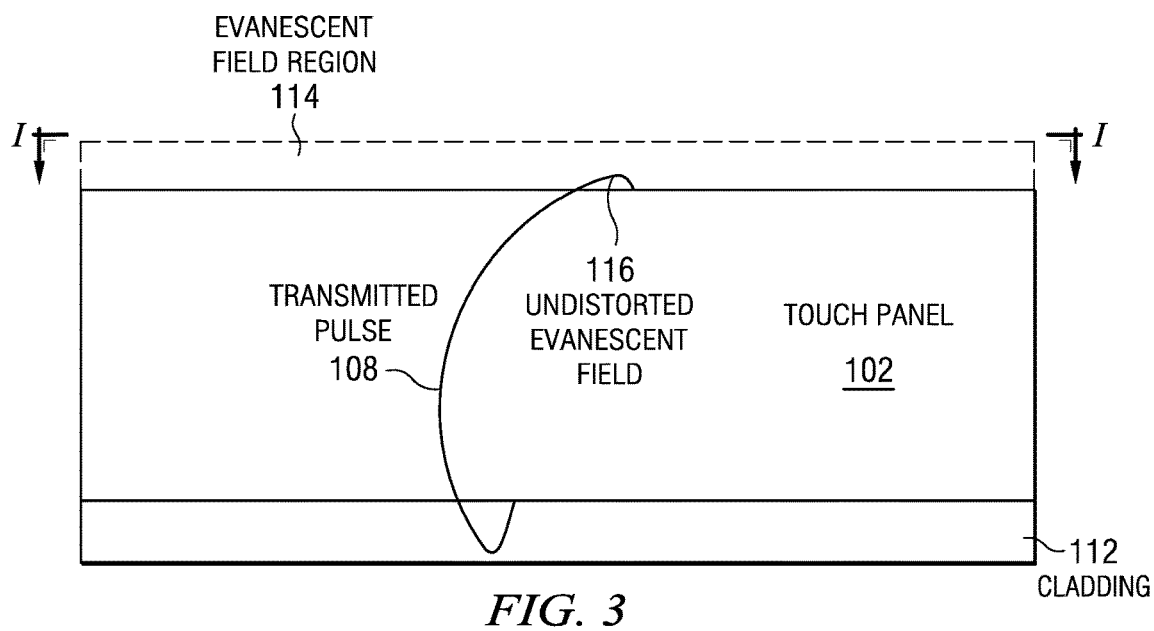
FIG. 3 is a cross-sectional diagram of FIG. 2 along section line I-I.
Figure 4:
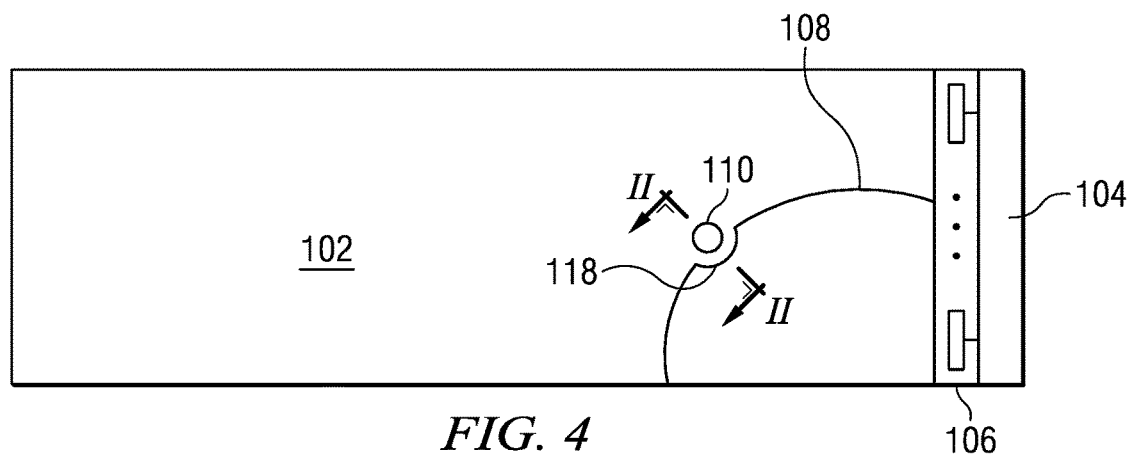
FIG. 4 is diagram an example of a portion of the operation of the system of FIG. 1.
Figure 5:
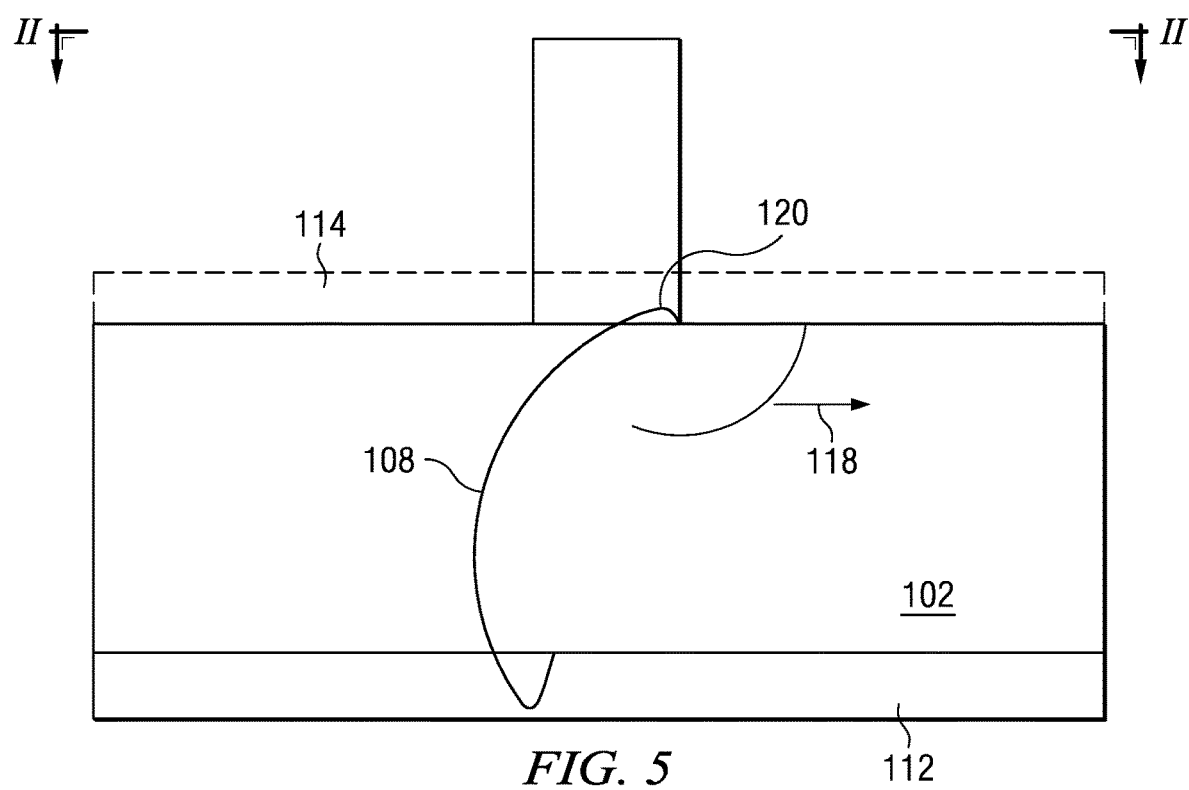
FIG. 5 is a cross-sectional diagram of FIG. 2 along section line II-II.

FIG. 1 shows an example of a system 100 in accordance with an embodiment. As shown, the system 100 generally comprises a touch panel 102, control circuit 104, signaling circuit 106, and reflectors 107-1 to 107-4. Generally, the touch panel 102 is a large panel (i.e., 2 m×2 m) formed of a sheet of dielectric material (such as glass or polyethylene) that is capable of carrying terahertz radiation (which typically has a frequency range between 0.1 THz and 10 THz) and functioning as a dielectric waveguide for this terahertz radiation. Usually, this touch pane 102 can also include a transparent cladding 112 (as shown in FIG. 3) located between the touch panel 102 and display (i.e., liquid crystal display or LCD screen). The signaling circuit generally comprises transmission and receiver circuit (i.e., such as the phased array system 200 detailed below) that is optically coupled to the touch panel so as to transmit and receive terahertz radiation through the touch panel 102. There are a number of configurations that the signaling circuit 106 may have such as a single transceiver (i.e., system 200), multiple transceivers, or a signal transmitter with multiple receivers. The control circuit 104 may includes logic or a processor (such as a digital signals processor or DSP) that is configured to calculate object location on the touch surface of the touch panel 102 and to control the signaling circuit. Also, reflectors 107-1 to 107-4 may be optionally included to assist in triangulating an object location and may be included at any position (including the periphery as shown) on the touch panel 102. There may be any number of reflectors, but one likely configuration is to include the reflectors 107-1 to 107-4 at each corner of the touch panel 102.

Because terahertz radiation exhibits optical behavior, it can be transmitted through the touch panel 102 in a similar manner infrared radiation being transmitted through an optical fiber. As a result, the terahertz radiation generates an evanescent field in an evanescent field region 114 that is adjacent to the touch surface of the touch panel 102. When transmitted through fibers or other transmission media, infrared, visible spectrum, and ultraviolet radiation also generate an evanescent field in an evanescent field region, but this region for infrared, visible spectrum, and ultraviolet radiation is much smaller than evanescent field region 114 because of the frequencies. Thus, because the evanescent field region 114 is so much larger, it is much easier for interference within this region 114 to be detected, as shown in FIGS. 2-5.

In the example shown in FIGS. 2-5, an object an object (i.e., a finger or pointer) 110 is located with in the evanescent field region 114 at a location on the touch surface of the touch panel 102. When the signing circuit 106 generates a pulse 108 of terahertz radiation, this transmitted pulse 108 propagates through the touch panel 102 and generates an undistorted evanescent field 116 within region 116. When the undistorted evanescent field 116 encounters the object 110 that is located within region 114, evanescent field 116 becomes distorted (as shown with the distorted evanescent field 120 of FIG. 5), and a reflected pulse 118 is generated. This reflected pulse 118 then propagates back to the signaling circuit 106. Based at least in part on the reception of this reflected pulse 118, the control circuit 104 can triangulate the position of the object on the touch surface of the touch panel 102. Usually, two or more receivers (which are spaced apart from one another) are employed, and the time-of-flight (or time elapsed from transmission to reception) along with the spacing between receivers within signaling circuit 106 can be used for triangulation. Alternatively or additionally, reflectors 107-1 to 107-4 (which have been omitted from FIGS. 2-5) may be employed to assist in performing triangulation.

Figure 6:
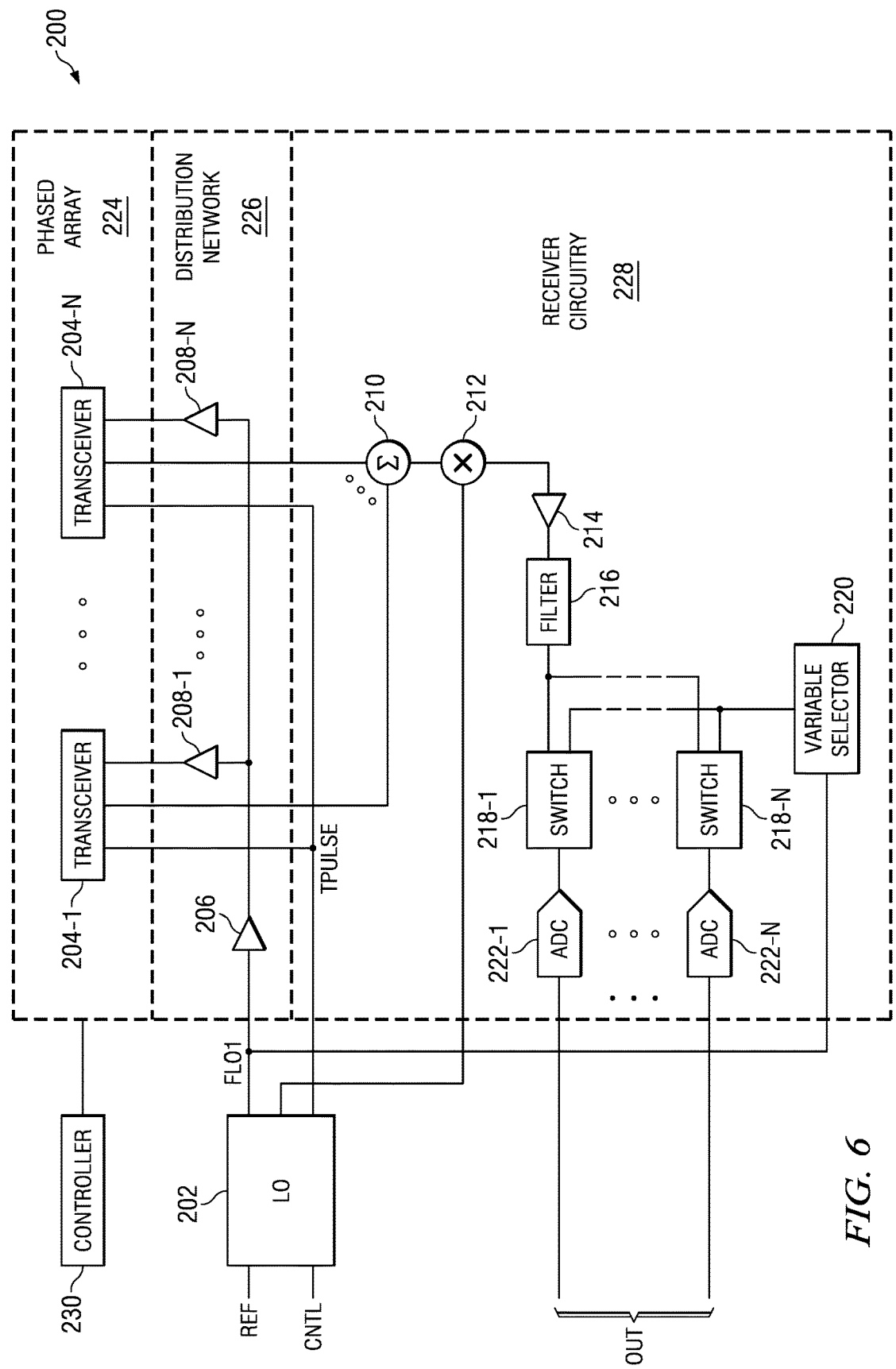
FIG. 6 is a block diagram of an example of a phased array system that can be employed with the signaling circuit of FIGS. 1-5.

FIG. 6 shows a phased array system 200 (which can be used as part of signaling circuitry 106). The phase array system 200 generally comprises a LO 202, a phased array 224, a distribution network 226, receiver circuitry 228, and controller 208. The phased array 224 generally comprises several transceivers 204-1 to 204-N arranged in an array. The distribution network 226 generally comprises amplifiers 206 and 208-1 to 208-N. Also, the receiver circuitry generally comprises a summing circuit 210, a mixer 212, amplifier 214, filter 216, switches 218-1 to 218-N, variable selector 220, and ADCs 222-1 to 222-N. While a phased array may not be necessary (i.e., a signal transceiver 204 may be employed), it may be preferable in order to allow for optical alignment with the touch panel 102. Also, detection of a single object (i.e., object 110) is shown in FIGS. 2-5, but detection of multiple objects (so-called "multi-touch") can be performed (in which multiple reflectors assist in eliminating background noise and more accurately determining the positions for the objects).

In operation, phased array system 200 (which is generally incorporated into an integrated circuit or IC) can generate a short range radar system that operates in the terahertz frequency range (which is generally between 0.1 THz and 10 THz). To accomplish this, local oscillator 202 generates a high frequency signal FL01 that is on the order of tens to hundreds of gigahertz (i.e., 40 GHz, 50 GHz, 67 GHz and 100 GHz) and a pulse signal TPUSLE. The distribution network 226 then provides signal FL01 to each of the transceivers 204-1 to 204-N such that the signals received by each of transceivers 104-1 to 204-N are substantially in-phase. A controller 208 provides a control signal to array 224, which phase-adjusts the transceivers 204-1 to 204-N with respect to one another to direct a beam of terahertz frequency radiation. The transceivers 204-1 to 204-N can then receive reflected radiation back from a target, which is provided to summing circuit 210. The output of summing circuit 210 is the converted to a digital signal by a mixer 212, amplifier 214, filter 216, switches 218-1 to 218-N, variable selector 220, and ADCs 222-1 to 222-N. Also, mixer 212 can receive a divided signal from LO 202 (i.e., FL01/2 or another synthesized signal) or can be removed (usually for 40 GHtz or less).

Generally, this phased array system 200 has several different types of operational modes: pulsed, continuous, and stepped frequency. For a pulsed operational mode, a pulse of terahertz radiation is directed toward a target. The continuous operational mode uses a continuously generated beam, which is generally accomplished by effective "shutting off" the pulse signal TPULSE. Finally, stepped frequency allows to frequency of the terahertz beam to be changed, which can be accomplished by employing a bank of local oscillators (i.e., 202). For the pulsed operational mode, in particular, the range of the system 200 is governed by the following equation:

$$R = \sqrt[4]{\sigma \frac{PG^2 \lambda n E(n)}{(4\pi)^3 kTBF\left(\frac{S}{N}\right)}}, \quad (1)$$

where:
- R is distance that can be measured or range;
- σ is the radar cross section of the target (usually not equal to the physical cross section);
- S/N is single pulse SNR at the intermediate frequency IF filter output (envelope detector input);
- kTB is the effective incoming noise power in receiver bandwidth B (B≠1/pulsewidth);
- F is noise figure of the receiver (derived parameter);
- P is the peak transmitter power;
- G is the antenna power gain;
- λ is wavelength of the radiation (i.e., for 200 GHz, ≠1.5 mm);
- n is number of integrations of pulses in the receiver (multi-pulse averaging); and
- E(n) is the efficiency of integration.

For a monolithically integrated, low power IC that includes system 200, this range is generally less than one meter.

Figure 7:
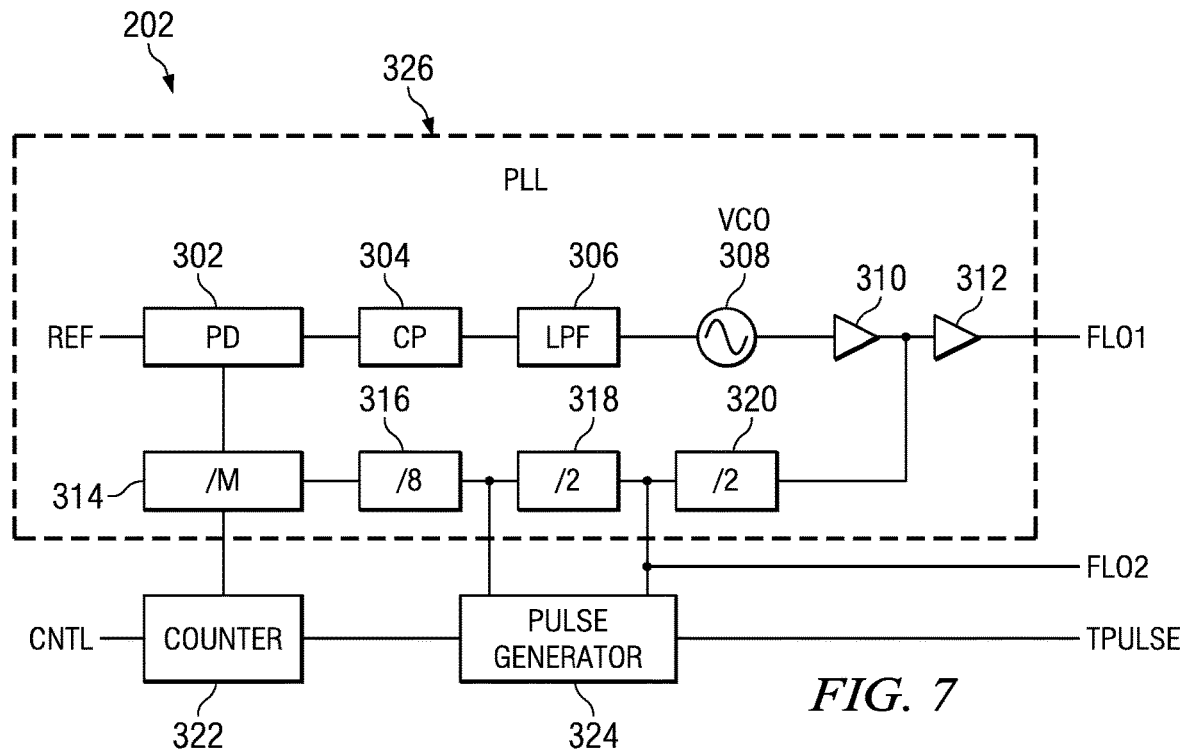
FIG. 7 is a block diagram of an example of the local oscillator (LO) of FIG. 6.

FIG. 7 shows an example of the LO 202 in greater detail. Generally, this LO 202 employs a phase locked loop (PLL) 326 that generates signals FL01 and FL02 from reference signal REF and employs counter 322 and pulse generator 324 to produce the pulse signal TPULSE. PLL 326 is generally comprised of a phase detector 302, charge pump 304, low pass filter 304, amplifiers 310 and 312, voltage controlled oscillator (VCO) 308, and dividers 320, 318, 316, and 314. In operation, the phase detector 302 receives a feedback signal from divider 314 and the reference signal REF, and (along with charge pump 304 and low pass filter 306) generates a tuning voltage for VCO 308. Usually, VCO 308 generates a high frequency signal (i.e., 100 GHz, 67 GHz, 50 GHz, or 40 GHz) which is amplified by amplifiers 310 and 312, producing signal FL01. Divider 320 (which is generally an injection-locked, divide-by-2 frequency divider) receives the output of amplifier to output signal FL02. Signal FL02 is then provided to divider 318 (which is generally a divide-by-2 current mode logic divider). The output of divider 318 is provided to divider 316 (which is generally a divide-by-8 current mode logic divider), and the output of divider 316 is provided to divider 314 (which is generally a divide-by-M CMOS divider) to generate the feedback signal. The counter 322 generates a count signal based on a control signal CNTL and the feedback signal from divider 314, and the pulse generator 234 produces the pulse signal TPULSE based at least in part on the count signal from counter 322 and the outputs of dividers 318 and 320.

Figure 8:
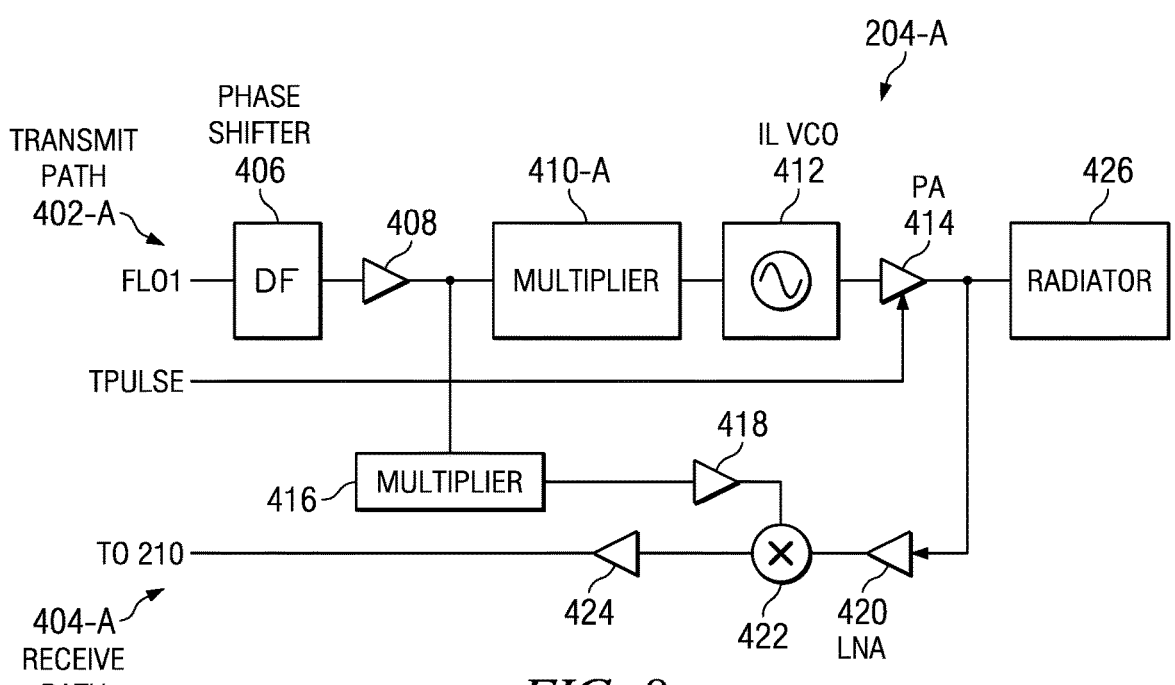
FIG. 8-11 are block diagrams of examples of the transceivers of FIG. 6.

FIG. 8 shows an example of one of transceivers 202-1 to 202-N (referred to as 202-A) in greater detail. As shown, transceiver 202-A generally includes a transmit path 402-A and a receive path 404-A that are each coupled to radiator 426 (i.e., antenna). During transmission, phase shifter 404 (which is generally controlled by controller 230) receives signal FL01 from LO 202 and phase-shifts signal FL01 accordingly. This phase shifted signal is amplified by amplifier 408 and multiplied by multiplier 410-A (which is usually a multiply-by-3 multiplier) that allows the signal FL01 to be increase to the desired frequency range. For example, if signal FL01 is about 67 GHz, then multiplier 410-A would output a signal having a frequency of about 201 GHz. This multiplied signal is provided to ILVCO 412, which is generally used to compensate for losses from multiplier 410-A. Also, ILVCO 412 receives the pulse signal TPULSE. Power amplifier (PA) 414 then amplifies the output of ILVCO 412 for transmission through radiator 426. Usually, the pulse widths of pulse signal TPULSE are about 30 ps, 60 ps, or 90 ps when the signal FL01 has a frequency of about 67 GHz. During reception, radiator 426 receives a signal, which is amplified by amplifier 420. This amplified signal is mixed with a signal having a frequency that is a multiple of signal FL01. Usually, multiplier 416 (which is generally a multiply-by-2 multiplier) receives an output from amplifier 408, and the result is amplified by amplifier 418 and provided to mixer 422. The mixed output is then amplified by amplifier 424 and provided to summing circuit 210. Also, mixer 422 is described in co-pending of U.S. patent application Ser. No. 12/871,626 entitled "DOWNCONVERSION MIXER."

Figure 9:
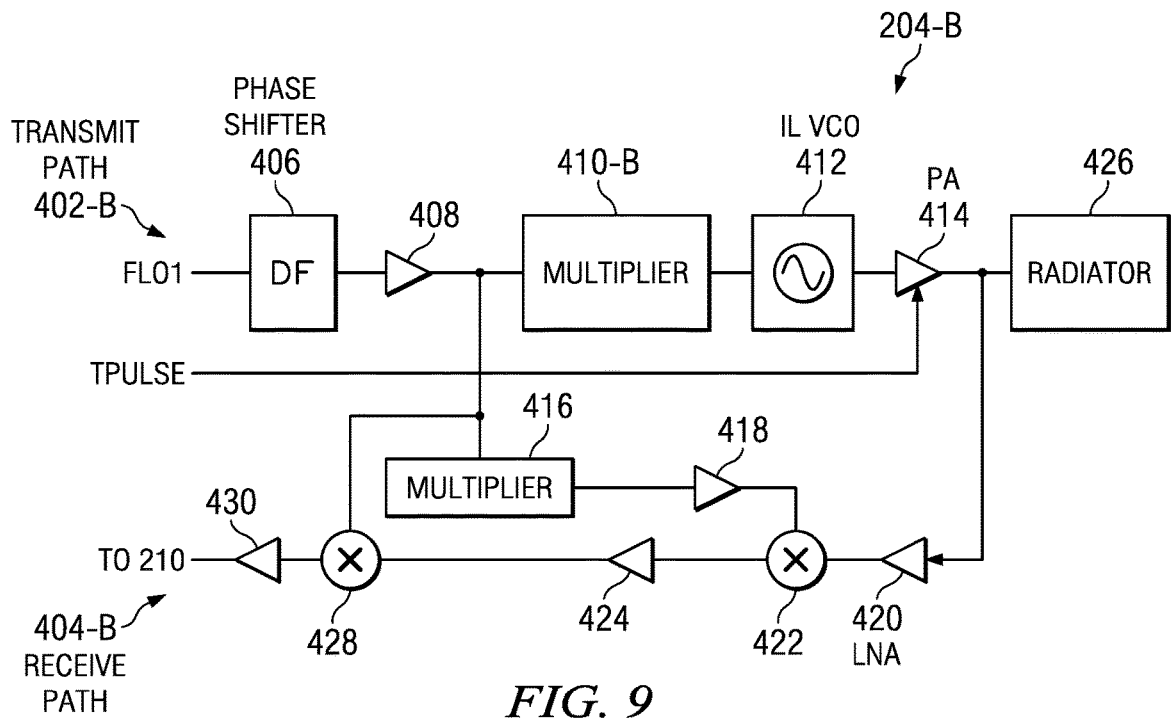

FIG. 9 shows an alternative configuration for one of transceivers 202-1 to 202-N (referred to as 202-B) in greater detail. The transmit path 402-B is similar to transmit path 402-A; however, multiplier 410-B has replaced multiplier 410-B. Generally, multiplier 410-B has a large range than multiplier 410-B to accommodate a lower frequency signal FL01. For example, if signal FL01 has a frequency of 50 GHz, then multiplier 410-B can be a multiply-by-4 multiplier to generate a signal that is on the order of 200 GHz. Also, to accommodate a lower frequency signal FL01, receive path 404-B includes a mixer 428 that mixes the outputs of amplifiers 424 and 408 and an amplifier 430. Also, the pulse widths of pulse signal TPULSE can be about 40 ps or 80 ps when the signal FL01 has a frequency of about 50 GHz.

Figure 10:
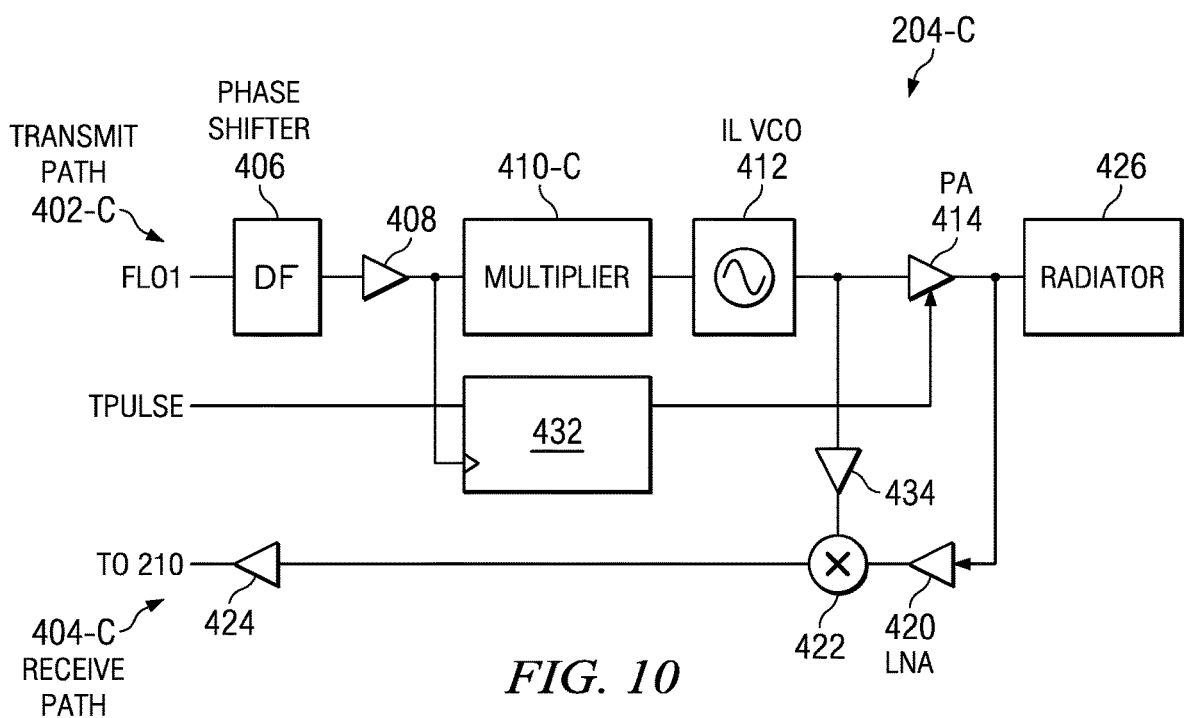

FIG. 10 shows yet another alternative one of transceivers 202-1 to 202-N (referred to as 202-C) in greater detail. Here, D flip-flop 432 has been included in the path for the pulse signal TPULSE; namely, the input terminal of flip-flop 432 receives the pulse signal TPULSE, while flip-flop is clocked by the output of amplifier 408. Also, multiplier 416 and amplifier 418 have been replaced by amplifier 434. This arrangement is generally useful for even lower frequency ranges (i.e., 40 GHz), which can produce pulse widths for pulse signal TPULSE are about 50 ps or 100 ps.

Figure 11:
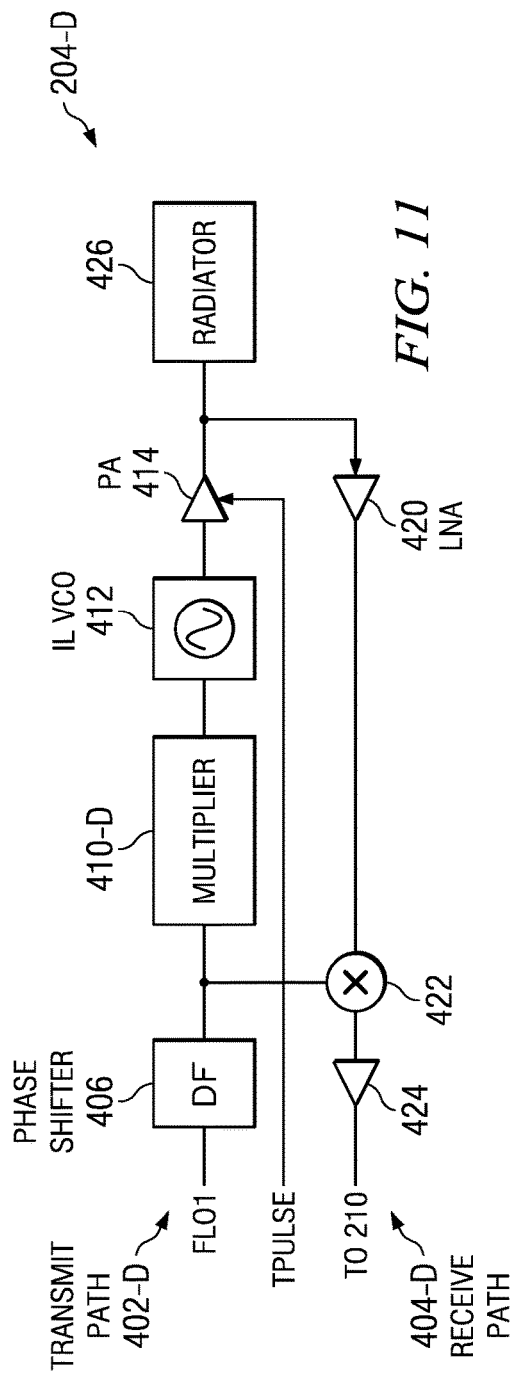

FIG. 11 shows another alternative one of transceivers 202-1 to 202-N (referred to as 202-D) in greater detail. Here, the transmit path 402-D is similar to path 204-A; however, multiplier 410-A has been replaced with multiplier 410-D, while amplifier 408 has been removed. Multiplier 410-D generally has a lower range to accommodate a signal FL01 with a high frequency. For example, if signal FL01 has a frequency of about 100 GHz, then multiplier 410-D can be a multiply-by-2 multiplier. Also, for receive path 404-D, multiplier 416 and amplifier 418 have been removed so that mixer 422 mixes the output of LNA 420 with the output of phase shifter 406.

Figure 12:
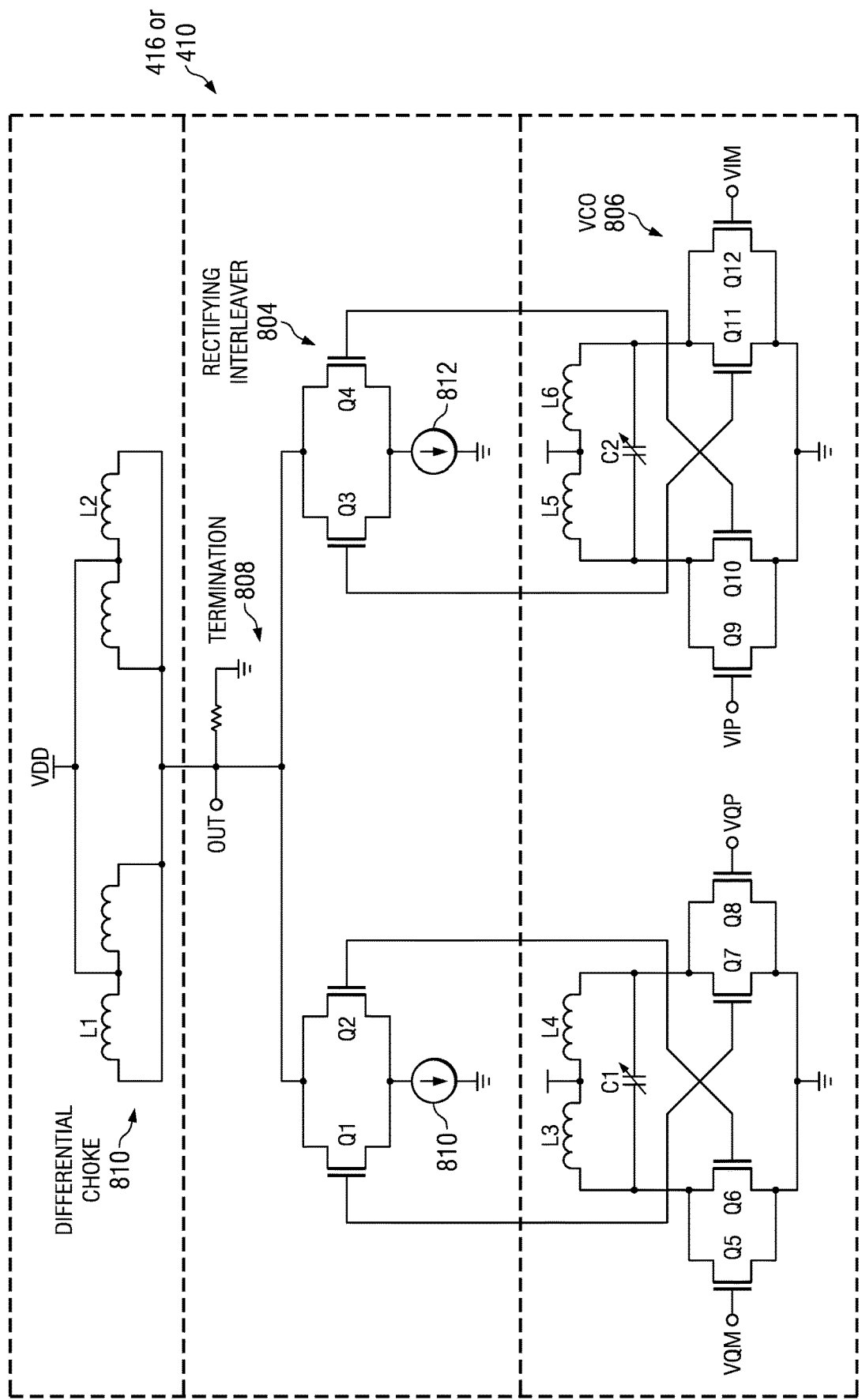
FIG. 12 is a circuit diagram of an example of the multipliers of FIGS. 8-11.

FIG. 12 is a circuit diagram of an example of multipliers 410 and/or 416. This type of multiplier 410 and/or 416 is generally employed within transceivers 202-1 to 202-N to produce very high frequencies (i.e., 200 GHz) because direct production of these high frequency signals is very difficult. Generally, multiplier 410 and/or 416 employs a differential choke 802, a rectifying interleaver 804, and a VCO 806. Usually, VCO 806 uses two oscillator tanks to generate two pairs of output signals from differential in-phase signals VIP and VIM and differential quadrature signals VQM and VQP. Usually, VCO 806 comprises MOS transistors Q5 through Q12, inductors L3 through L6, and capacitors C1 and C2. Rectifying interleaver 804 employs two differential pairs of transistors Q1/Q2 and Q3/Q4 and current sources 810 and 812 to interleave the outputs from VCO 806 to generate a single-ended output signal OUT. Also, a termination 808 and inductors L1 and L2 (from differential choke 802) are coupled to the rectifying interleaver 804. Usually, power output is sufficient to lock ILCVO 412 (i.e., −20 bBm).

Figure 13:
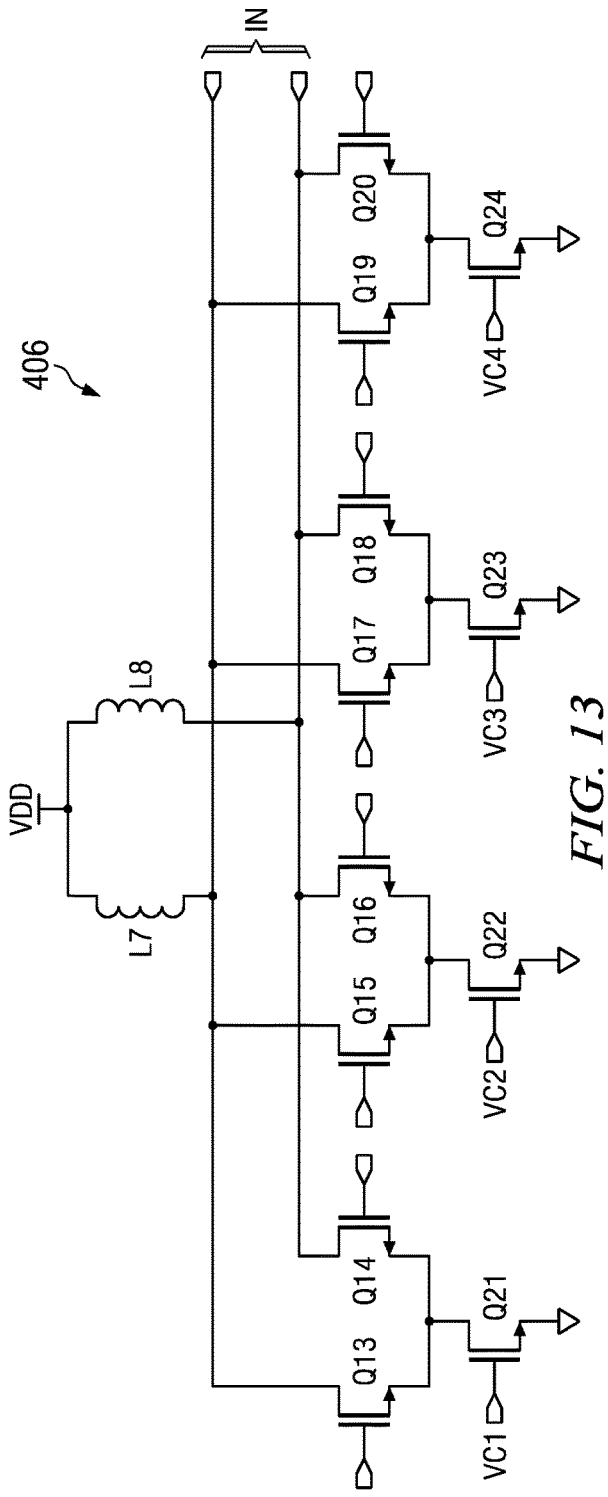
FIG. 13 is a circuit diagram of an example of the phase shifters of FIGS. 8-11.

FIG. 13 shows an example of phase adjuster 406. Here, a differential input signal IN (which is generally signal FL01 from LO 202) is provided to differential pairs of MOS transistors Q13/14, Q15/Q16, Q17/Q18, and Q19/Q20 (which are also coupled to inductors L7 and L8). Based on control signals VC1 through VC4 received from controller 236, transistors Q21 through Q24 can activate the differential pairs Q13/14, Q15/Q16, Q17/Q18, and Q19/Q20 to generate a phase rotation of the differential input signal IN, having a total phase shift range of less than about ±22.5°. Usually, phase shifting is performed in the lower frequency domain (i.e., 50 GHz) to generally ease any bandwidth requirements and efficiently recover power losses.

Figure 14:
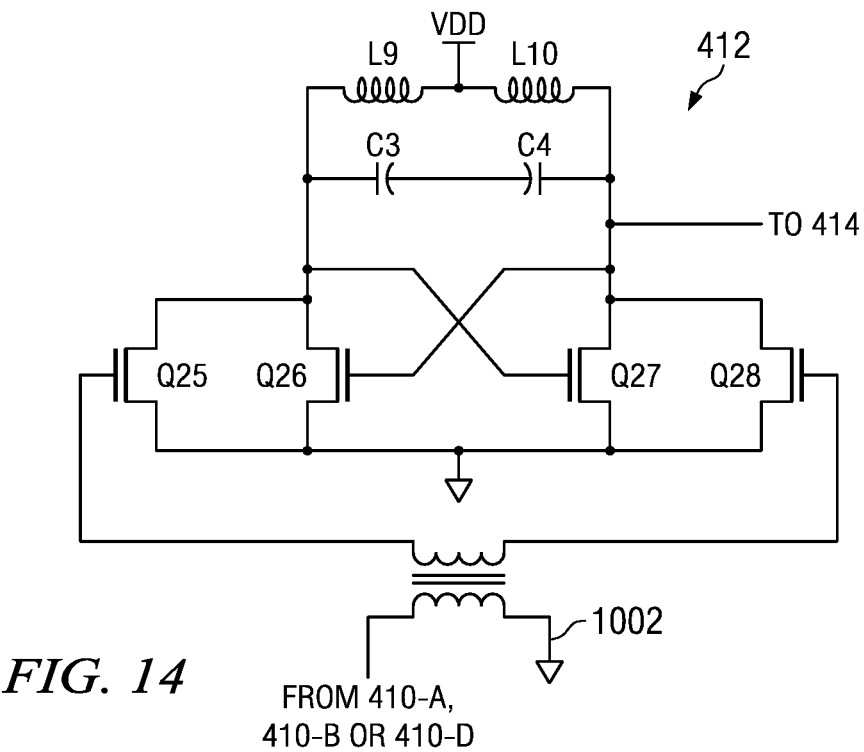
FIG. 14 is a circuit diagram of an example of the injection locked voltage controlled oscillator (ILVCO) of FIGS. 8-11.

FIG. 14 is a circuit diagram of an example of ILVCO 412. ILVCO 412 is generally employed because of the losses from multiplier 410. Theoretically, ILVCO 412 can provide an infinite gain if the center frequencies match with a finite gain throughout the locking range. Usually, MOS transistors Q25 and Q28 are coupled at their respective gates to balun 1002, which receives an output from multiplier 410 (i.e., 410-A, 410-B, or 410-C). In an alternative configuration, MOS transistor Q28 can receive receives an output from multiplier 410 (i.e., 410-A, 410-B, or 410-C) at its gate, while MOS transistor Q28 receives the pulse signal TPULSE at its gate. These transistors Q25 and Q28 are generally coupled in parallel to a gain stage (which is generally comprised of cross-coupled MOS transistors Q26 and Q27) and the oscillator tank (which is generally comprised of capacitors C3 and C4 and inductors L9 and L10). Alternatively, the second harmonic of the output can be used instead of first harmonic to relax any tuning range requirements, but with reduced output power. As an illustration, the properties of ILVCO 412 are shown in the following Table 1 using both the first and second harmonics.

TABLE 1

| Targets | First Harmonic | Second Harmonic |
| --- | --- | --- |
| Input Frequency [GHz] | 200 | 100 |
| Output Frequency [GHz] | 200 | 200 |
| Power Output [dBm] | −12 | −12 |
| Phase locking | @200 GHz | @100 GHz |

Figure 15:
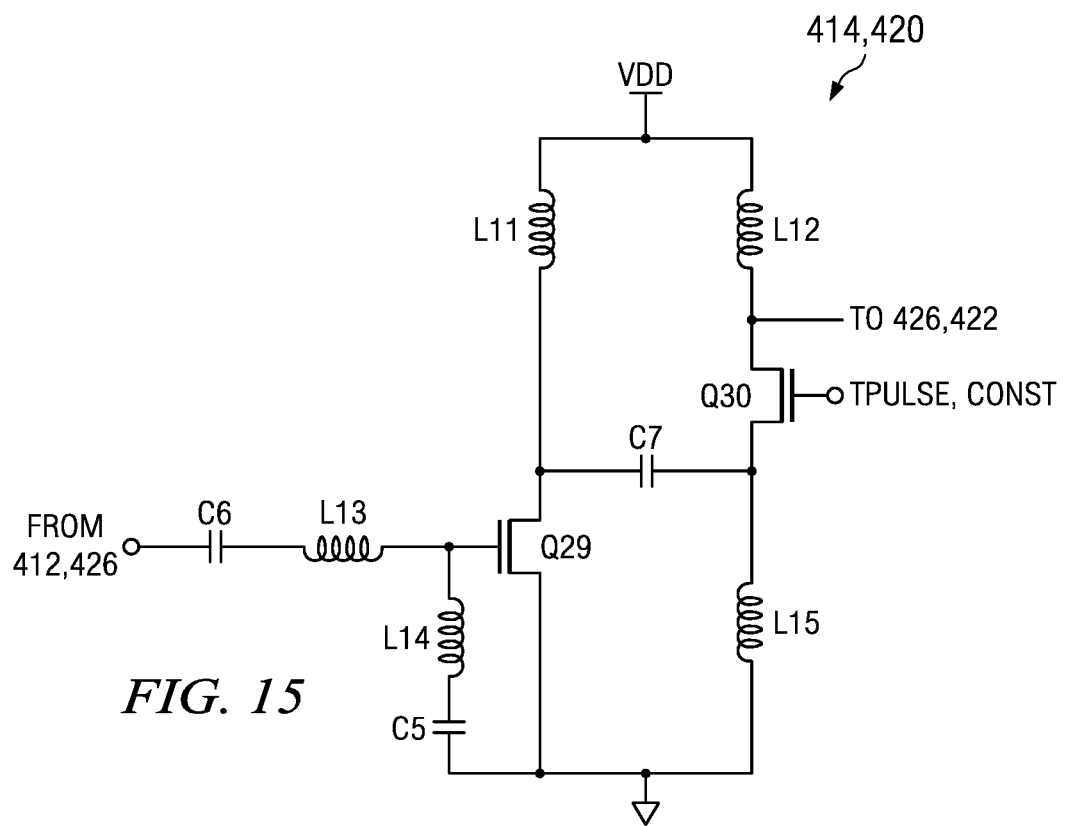
FIG. 15 is a circuit diagram of an example of the power amplifier (PA) and low noise amplifier (LNA) of FIGS. 8-11.

FIG. 15 is a circuit diagram for an example of PA 414 and/or LNA 420. Generally, the PA 414 and/or LNA 420 can provide linear amplification and isolation, and one of the features of PA 414 and/or LNA 420 is its ability to be power gated with a fast pulse time (i.e., tens of picoseconds). PA 414 and/or LNA 420 generally comprise inductors L11 through L15, capacitors C5 through C7, and transistors Q29 and Q30. Here, the capacitors C5 through C7 are resonated by series or shunt inductors L11 through L15 to provide the amplification with transistors Q29 and Q30. Also, the input and output of PA 414 and/or LNA 420 can be matched input or output impedances. For example, for PA 414, the output impedance can be matched to the radiator 426. Moreover, the circuit shown in FIG. 11 can be cascaded in multiple stages, where the gain can be between 0 and 2 dB per stage.

Figure 16:
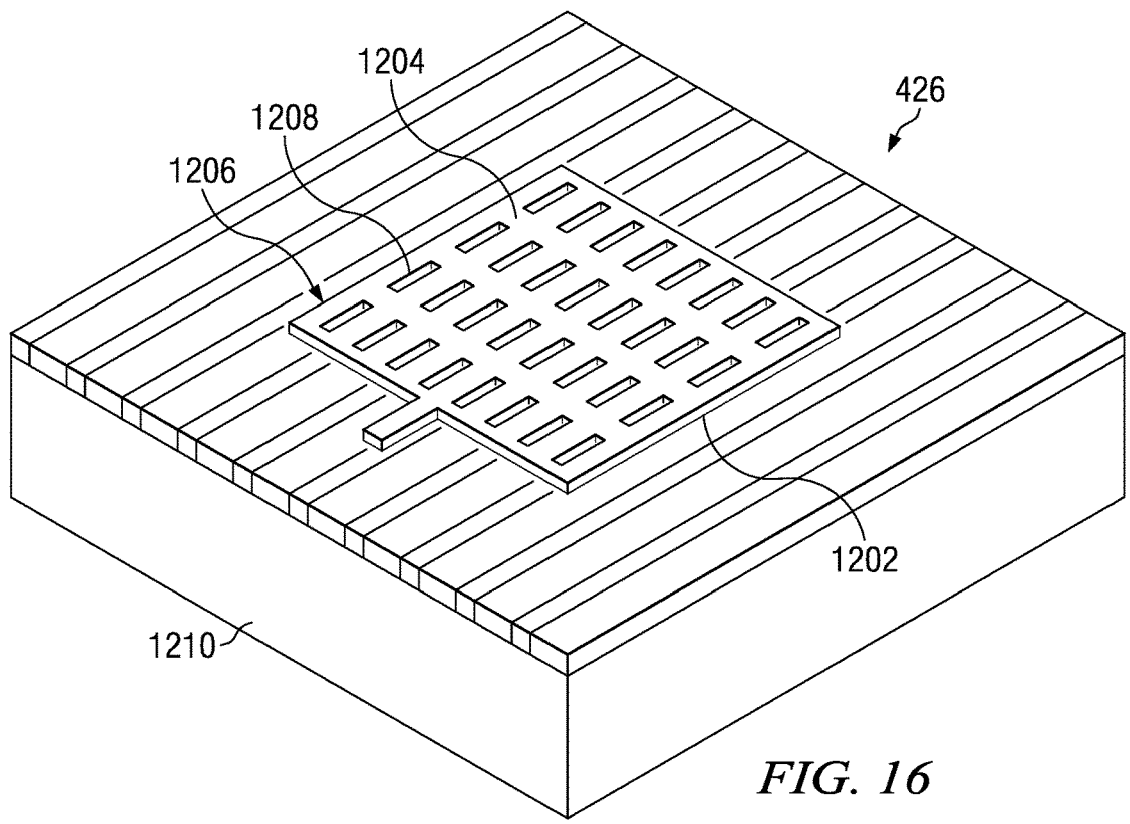
FIG. 16 is block diagram of an example of the radiator of FIGS. 8-11.
Figure 17:
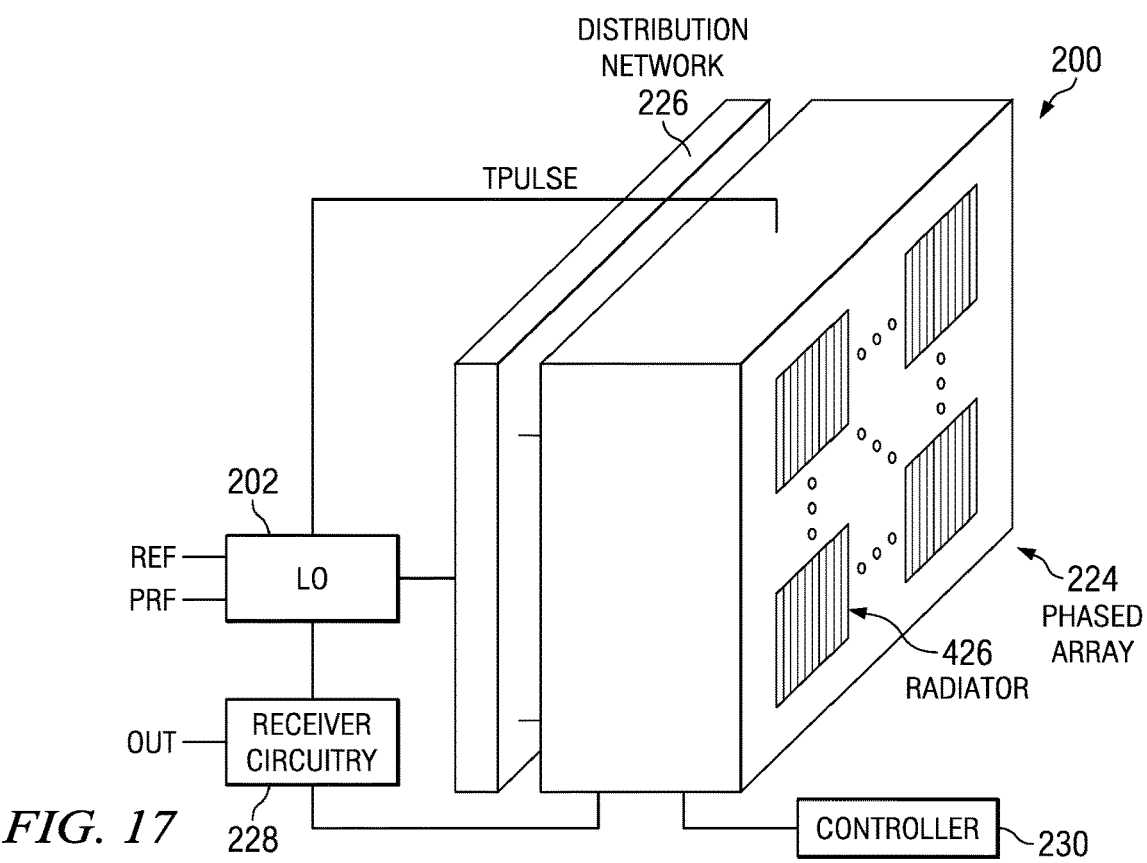
FIG. 17 is a block diagram of the phased array system of FIG. 6.

FIG. 16 shows an example of a radiation 426. Here, radiator 426 is shown as being a patch antenna formed over a substrate 210. This patch antenna generally comprises a patch 1204 having slots 128 that are generally parallel to ground strips and radiating edges 1202. For a frequency of about 410 GHz (which has a wavelength of about 0.75 mm in air), the width W and length L of patch 1204 are each about 200 μm, while the slots are 2 μm wide. The proportions of the patch antenna can then be varied so as to accommodate a desired emission frequency (and wavelength). These radiators 426 (i.e., patch antennas) can then be formed into an array as shown in FIG. 17. Alternatively, radiator 426 can be a bondwire Yagi-Uda antenna.

Figure 18:
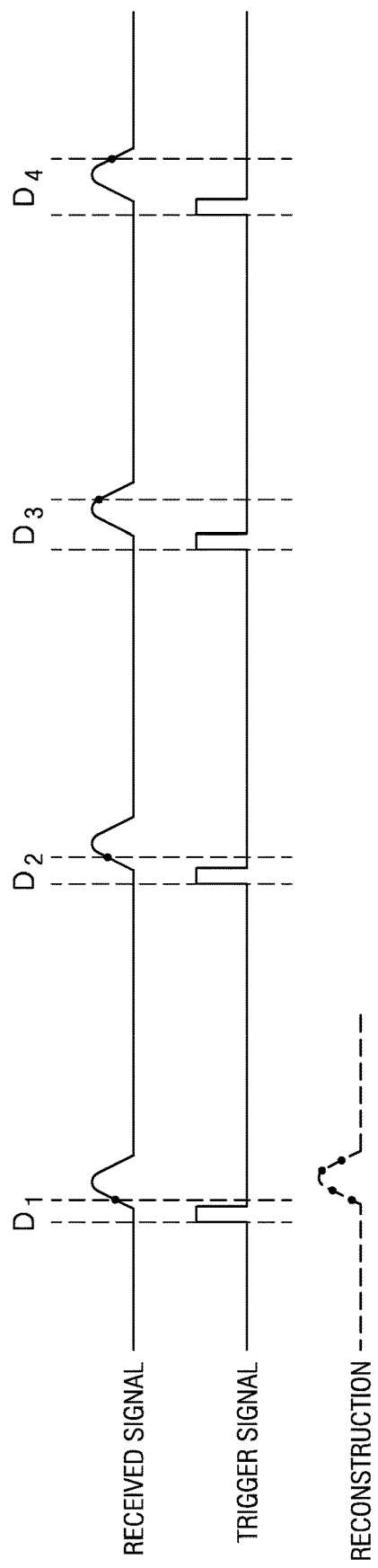
FIGS. 18 and 19 are timing diagrams that depict examples of the operation of the phased array system of FIG. 6.
Figure 19:
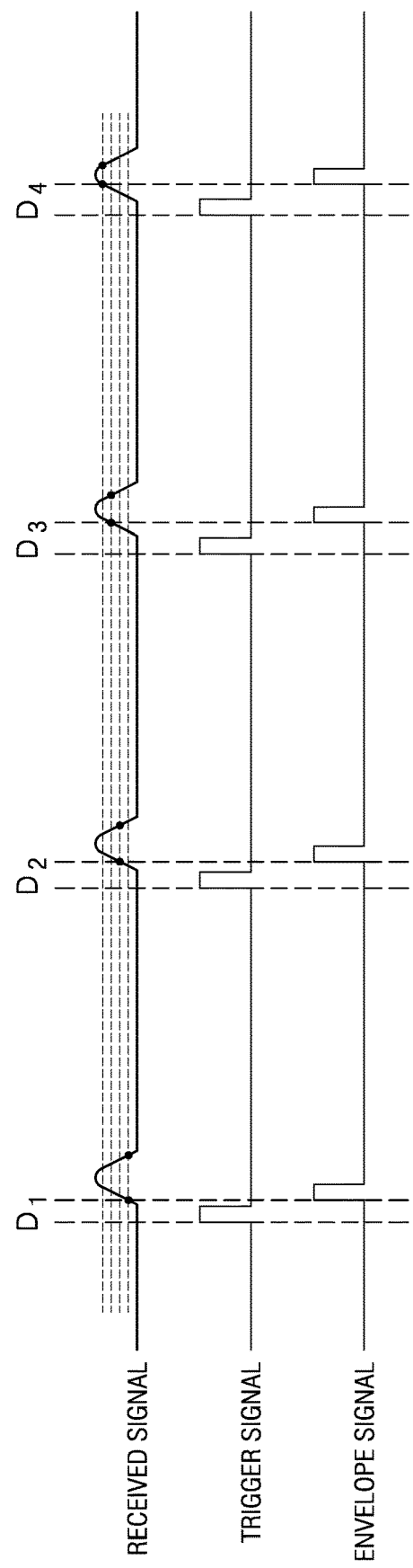

Because the data bandwidth of system 200 is very high (i.e., on the order of tens of gigahertz), it is generally impractical to employ an ADC that digitizes the signals receives through by the receiver circuitry 228. FIGS. 18 and 19 are timing diagrams that generally depict the operation of the receiver circuitry 228, where each uses a trigger signal to reconstruct the received signal. For FIG. 18, variable selector 220 actuates switches 218-1 to 218-N at various periods (i.e., $\Delta_1$ to $\Delta_4$) following the trigger signal to allow each of the ADCs 222-1 to 222-N to resolves a portion of the received signal. FIG. 19, on the other hand, use an envelop signal following the periods (i.e., $\Delta_1$ to $\Delta_4$) as part of the control mechanism for switches 218-1 to 218-N.

Figure 20:
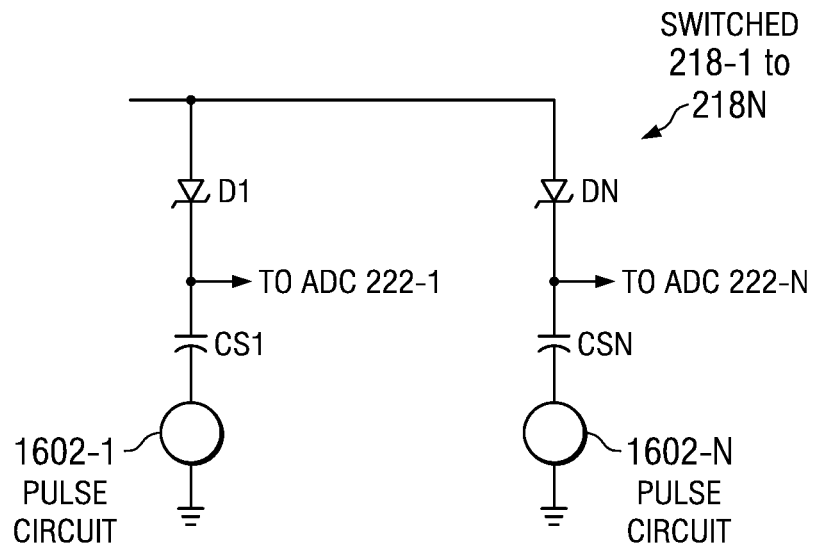
FIG. 20 is a circuit diagram of an example of the switches of FIG. 6.

To accomplish this, several approaches can be taken. FIG. 20 shows an example for one arrangement. In this arrangement, the switches 218-1 to 218-N are comprised of zener diodes D1 to DN, capacitors CS1 to CSN, and pulse circuits 1602-1 to 1602-N (which are generally controlled by the variable selector 220). These switches 218-1 to 218-N operate as an input sampling network where each capacitor CS1 to CSN is coupled to a "slow" ADC 222-1 to 222-N. Generally, this approach may require very small apertures and very accurate clock generation.

Figure 21:
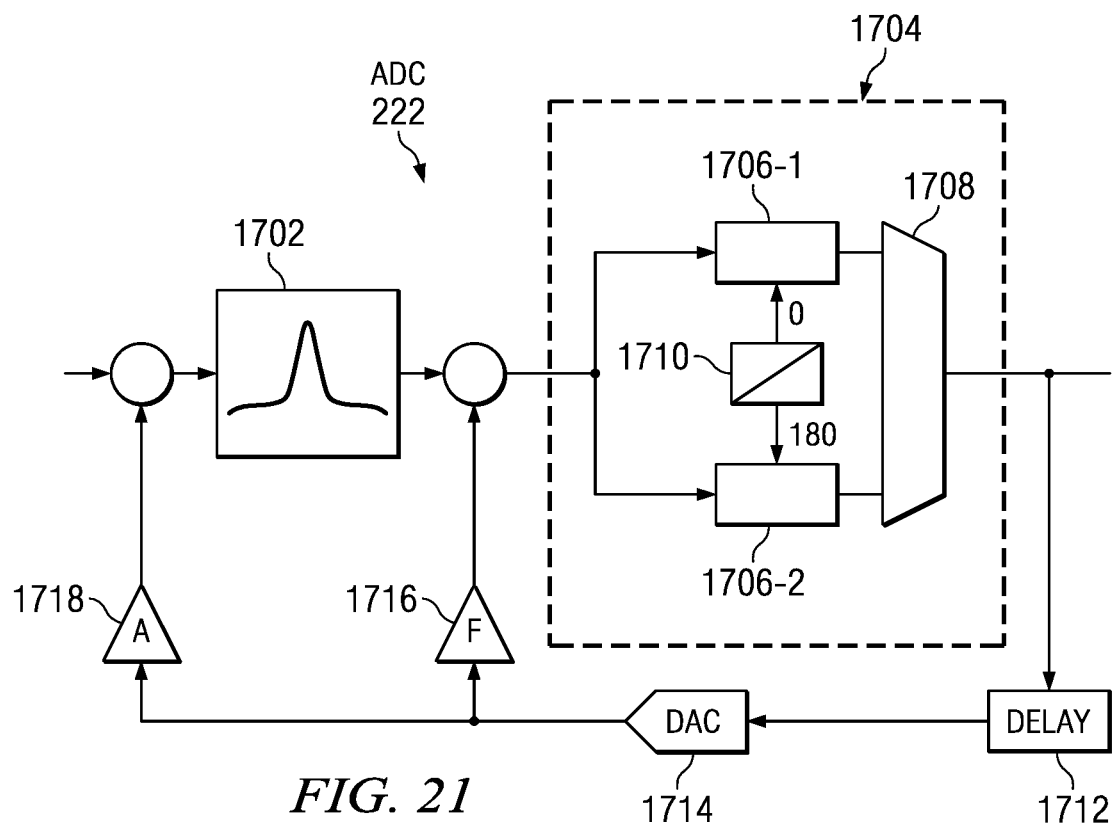
FIG. 21 is a circuit diagram of an example of the analog-to-digital converters (ADCs) of FIG. 6.

Another arrangement is shown in FIG. 21. For this arrangement, ADCs 222-1 to 222-N (referred to as 222) are low pass/band pass sigma-delta converters that can directly digitize about a 10 GHz bandwidth with a clock of about 100 GHz. ADC 222 generally comprises a filter 1702, a quantizer 1704, a delay 1712, a digital-to-analog converter (DAC) 1714, and amplifiers 1716 and 1718. The quantizer 1704 generally comprises quantizers 1706-1 and 1706-2, clock divider 1710, and multiplexer 1708. In operation, a feedback signal (which is amplified by amplifier 1718) is combined with the input signal and filtered by filter 1702. This filtered output is combined with the feedback signal (which is amplified by amplifier 1716). Quantizer 1704 (which is generally an 2-bit, 2-way interleaved quantizer operating at 1.5 GHz) quantizes the signal (which is then delayed by delay 1712 and converted to a feedback signal by DAC 1714).

Figure 22:
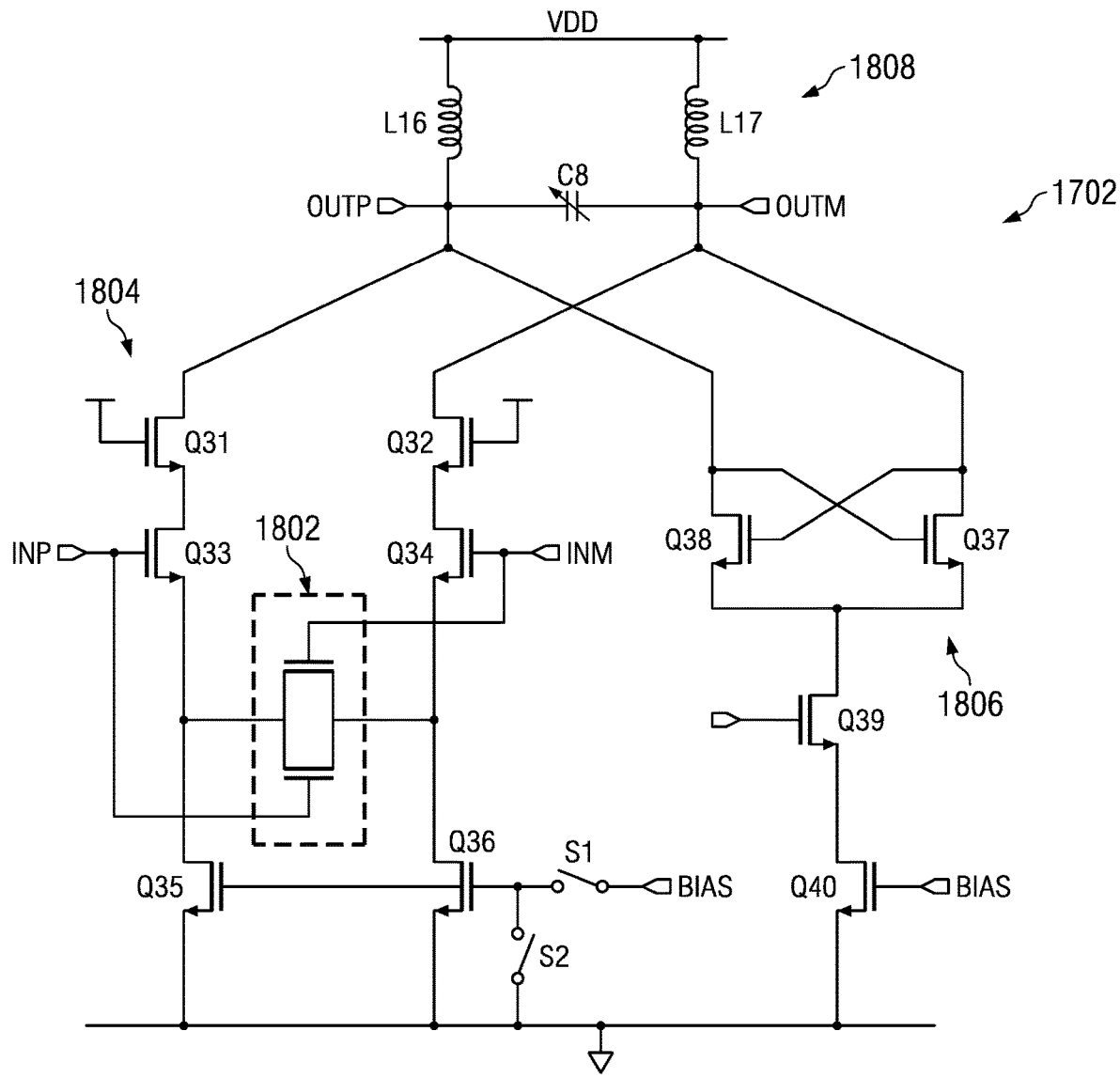
FIG. 22 is a circuit diagram of the low pass/band pass filter of FIG. 17.

The filter 1702 is shown in greater detail in FIG. 22. For example, the filter 1702 operates as amplifier and LC filter. To accomplish this, filter 1702 generally comprises a trasconductor cell 1804 (which generally comprises transistors Q31 through Q36, linearizer 1802 and switches S1 and S2) and a negative transconductor cell 1806 (which generally comprises transistors Q37 through Q40) that are each coupled to an LC circuit 1808 (which generally comprises inductors L16 and L17 and capacitor C8).

Figure 23:
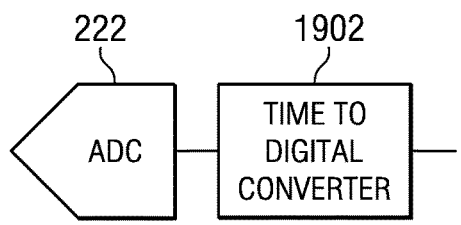
FIGS. 23 and 24 are circuit diagrams of an example of a time to digital converter used with the ADCs of FIG. 6.
Figure 24:
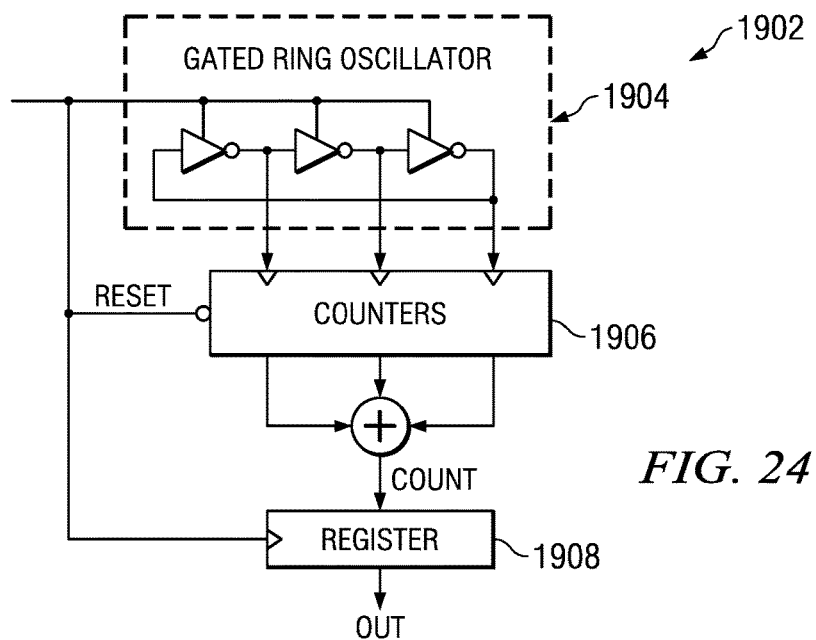
Figure 25:
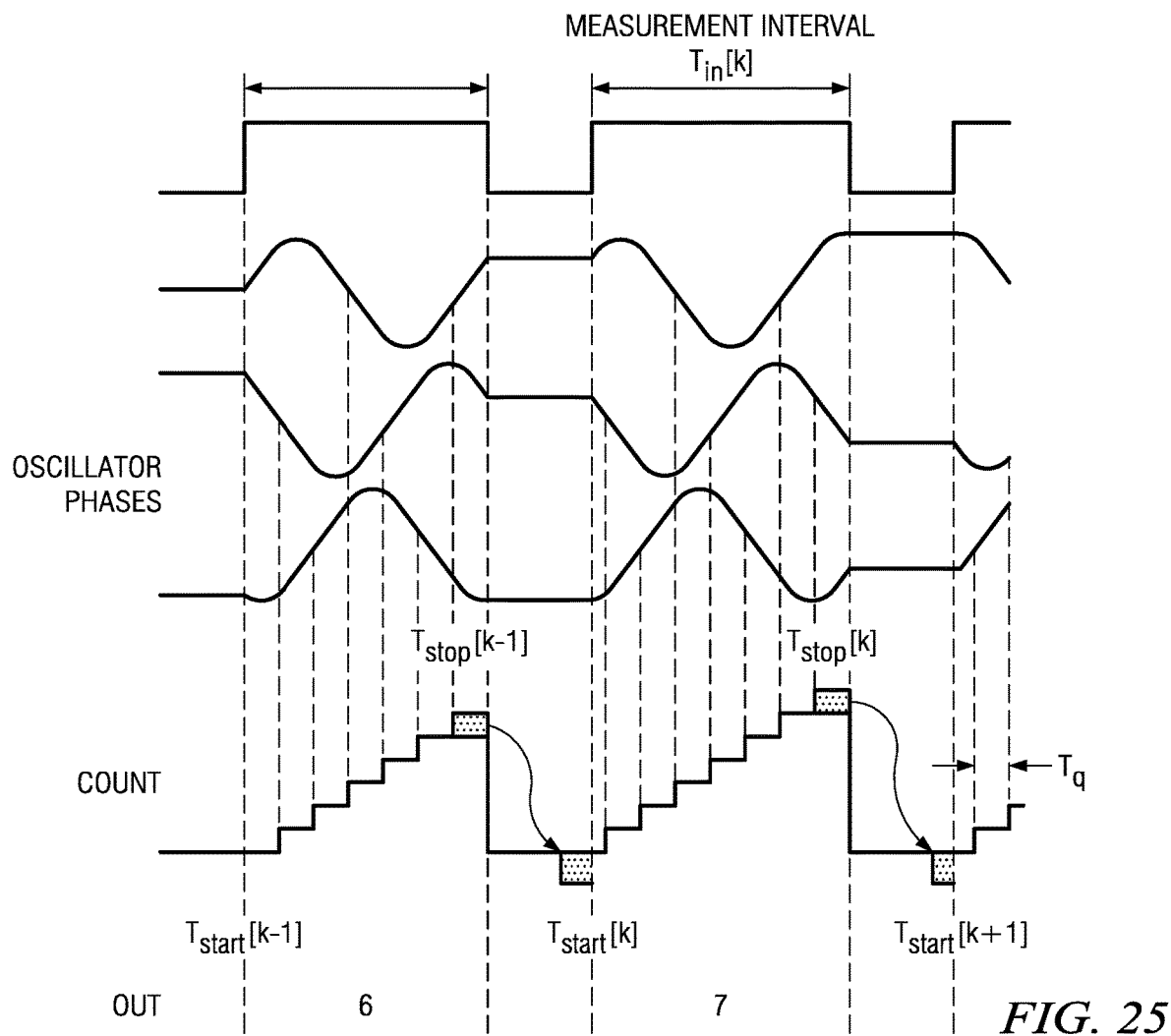
FIG. 25 is a timing diagram depicting an example of the operation of the time to digital converter of FIGS. 23 and 24.

Yet another approach is shown in FIGS. 23, 24 and 25. Here, a time to digital converter 1902 is coupled to each ADC 222-1 to 222-N; only one ADC, labeled 222, is shown, however. This converter 1902 has sub-picosecond resolution and, in operation, enabled when the input signal transitions to logic high or "1." This activates the gated ring oscillator 1904 so that the counters 1906 can performed counting operations from the taps of the oscillator 1904. The outputs from the counters 1904 can then be summed and stored in register 1904.

Figure 26:
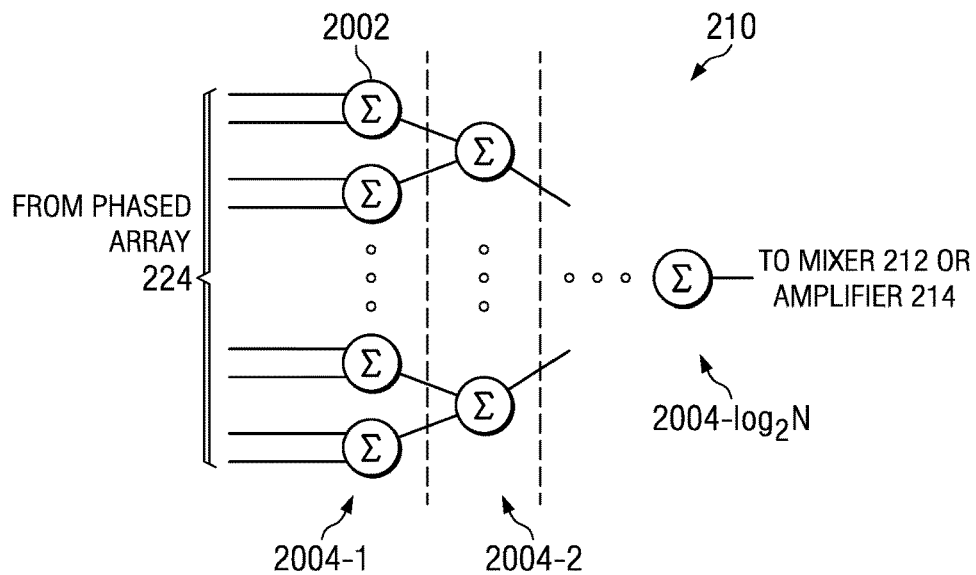
FIG. 26 is a circuit diagram of an example of the summing circuit for the receiver circuitry of FIG. 6.

FIG. 26 is a circuit diagram of an example of summing circuit 210. Usually, summing circuit 210 is a summing amplifier that is formed as a summing amplifier tree. As shown in FIG. 20, each summing circuit or summing amplifier 2002 receives a pair of input signals. At the first stage 2004-1 of the tree each summing circuit 2002 is coupled to a pair of transceivers (i.e., 204-1 and 204-1). Then each subsequence stage (i.e., 2004-2) receives input signals from a pair of summing circuits 2002 from the previous stage (i.e., 2004-1). As a result the tree has a depth of $\log_2 N$, where N is the number of transceivers 204-1 to 204-N.

As stated above, for a monolithically integrated, low power IC that includes system 200, this range is generally less than one meter. Thus, it should be apparent that in the terahertz frequency range, there is a shortage of available power, which results in decreased sensitivity, and with other frequency range systems being available that have fewer limitations than terahertz systems, transmission and reception in the terahertz range usually becomes attractive when there is a large increase in available bandwidth. However, transmitting, receiving and digitizing such large bandwidths (i.e., >10 GHz) can be problematic, due at least in part to analog-to-digital converter (ADC) performance requirements.

These issues, though, are addressed in system 200. For example, system 200 generally employs an increased pulse repetition frequency (PRF) of the terahertz radar so as to reduce coherency losses due to target motion. By making use of a high PRF, a small portion (subset) of the total available time for reception can be digitized, and by scanning this subset rapidly, it is possible to generate the full reception interval, reducing the overhead for a very high sampling frequency on the ADC. The high PRF can also generally ensure that it is possible to digitize the desired reception interval very quickly. Also, because of the lack of signal power, most signals should include baseband averaging of pulse reception, in system 200 some averaging is performed in the analog domain so as to reduce the ADC and digitization conversion rate to be equal to the PRF, which is an easily manageable task.

Figure 27:
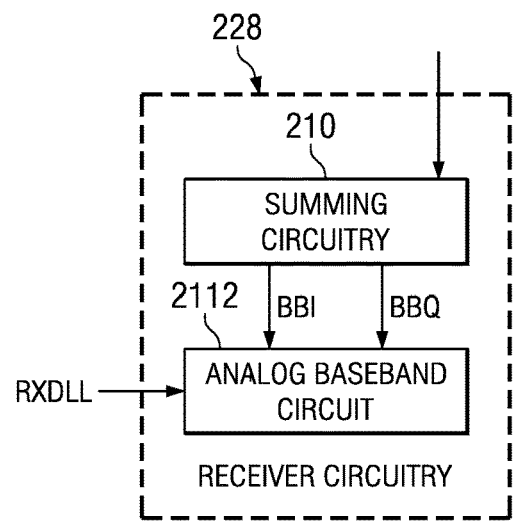
FIG. 27 is a diagram of an example of the receiver circuitry of FIG. 6.
Figure 28:
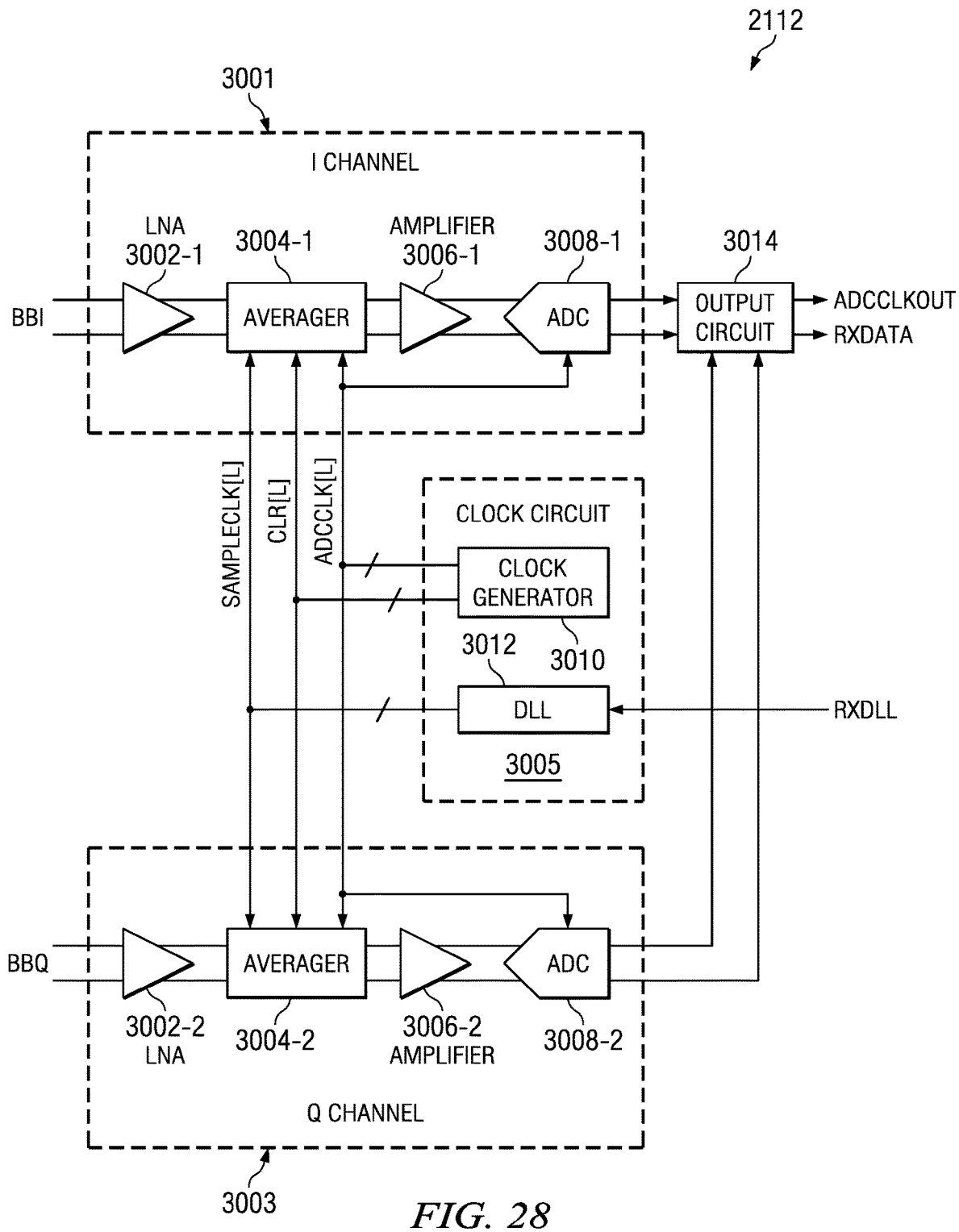
FIG. 28 is a diagram of an example of the analog baseband circuit of FIG. 27.

FIGS. 27 and 28 show alternative receiver circuitry 228. As shown, this circuitry 228 includes an analog baseband circuit 2116, which performs the analog averaging and digitization for system 200. The analog baseband circuit 2116 generally comprises an in-phase or I channel 3001, a quadrature or Q channel 3003, a clock circuit 3005, and an output circuit 3014. Each of these channels 3001 and 3003 generally and respectively includes a low noise amplifier (LNA) 3002-1 and 3002-2, an averager 3004-1 and 3004-2, an amplifier 3006-1 and 3006-2, and an ADC 3008-1 and 3008-2. The clock circuit 3005 generally comprises a clock generator 3010 (which can generate an ADC clock signal ADCCLK[L] and a clear signal CLR[L]) and a DLL 3012 (which can generate a sample clock signal SAMPLECLK [L]).

In operation, a digital output signal RXDATA and clock signal ADCCLKOUT are generated from the baseband input signals BBI and BBQ and DLL clock signal RXDLL. Usually, BBI and BBQ are differential signal (as shown), but may also be single-ended. These I and Q baseband signals BBI and BBQ (which are generally received from the summing circuitry 210) are respectively amplified by amplifiers 3002-1 and 3002-2. Because there are difficulties in digitizing the high bandwidth (as explained above), the performance requirements for ADCs 3008-1 and 3008-2 can be reduced by averaging the output of LNAs 3002-1 and 3002-1 with averagers 3004-1 and 3004-2.

Figure 29:
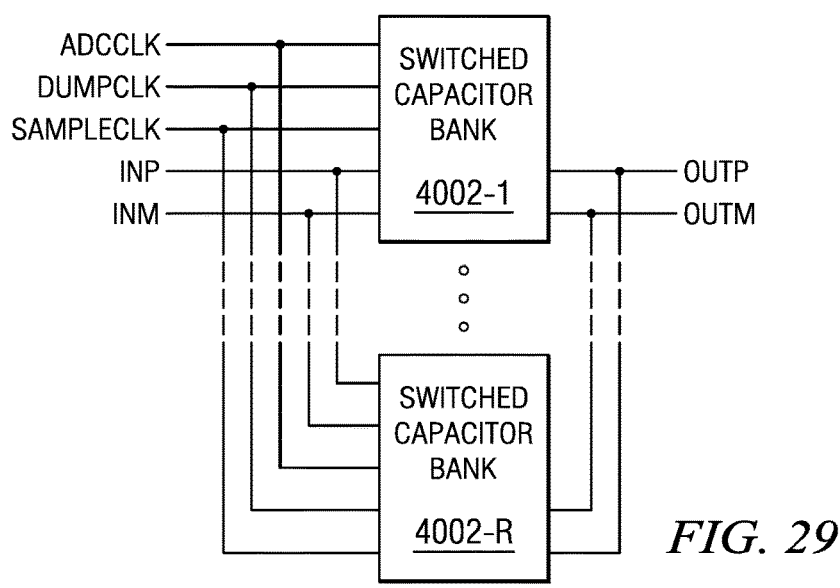
FIG. 29 is a diagram of an example of the averagers of FIG. 28.
Figure 30:
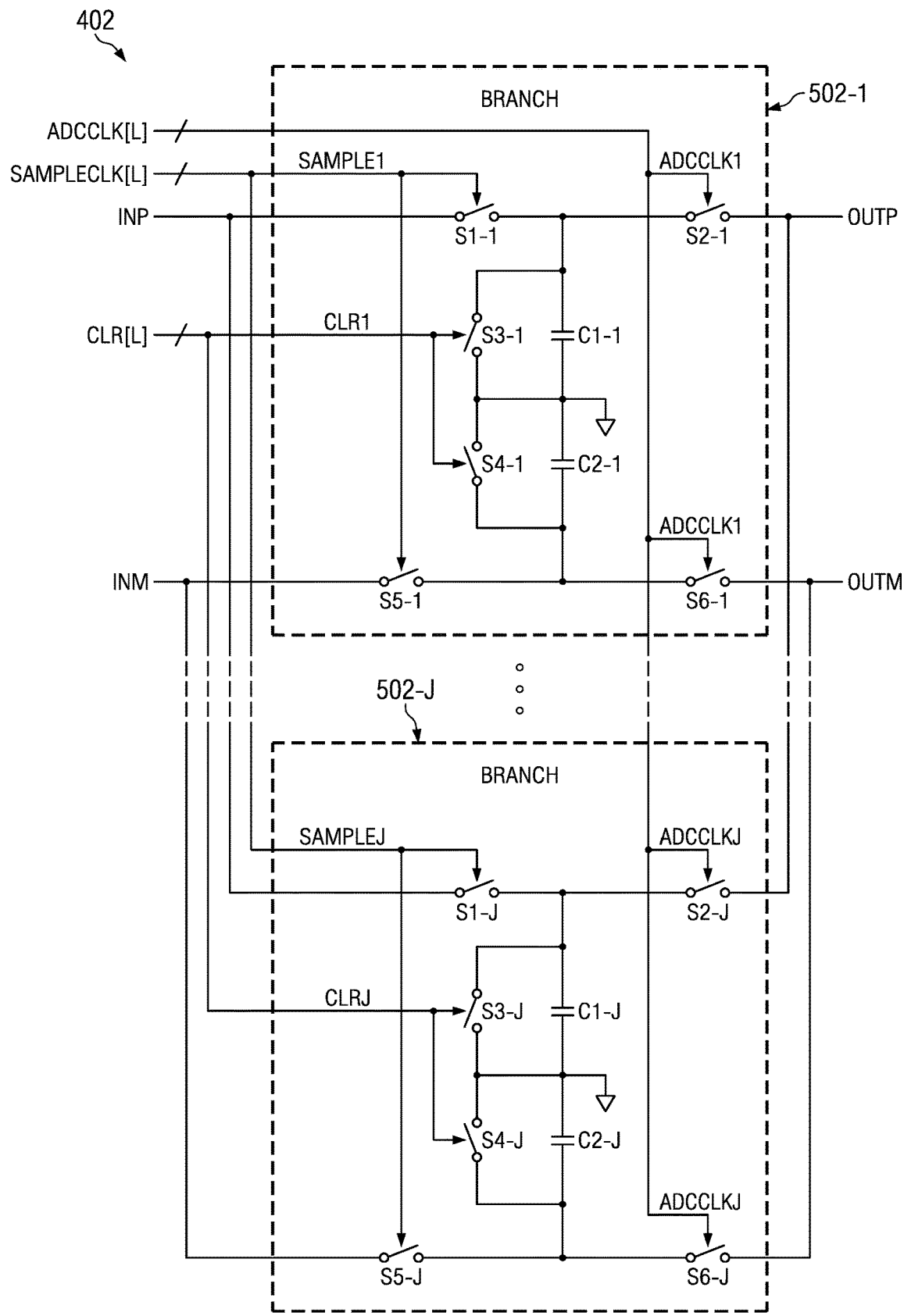
FIG. 30 is a diagram of an example of the switched capacitor banks of FIG. 29.

The averagers 3008-1 and 3008-2 (which are shown in greater detail in FIGS. 29 and 30) generally comprise switched capacitor banks 4002-1 to 4002-R with each bank having several branches 5002-1 to 5002-J; for example and as shown in FIG. 30, each branch (which is labeled 4002) has J branches. As with the baseband signals BBQ and BBI, branches 5002-1 to 5002-J are arranged to receive differential signals, but branches 502-1 to 502-J can be arranged to receive single-ended signals. These branches 5002-1 to 5002-J generally and respectively comprise sample switches S1-1 to S1-J and S5-1 to 55-J, capacitors C1-1 to C1-J and C2-1 to C2-J, clear switches S3-1 to 53-J and S4-1 to 54-J, and output switches S2-1 to S2-J and S6-1 to 56-J. The sample switches S1-1 to S1-J and S5-1 to 55-J are each generally coupled to a tap of the DLL 3014 so as to receive branch sample signals SAMPLE1 to SAMPLEL, respectively (where sample clock signal SAMPLECLK[L] is generally comprised of clock signals SAMPLE1 to SAMPLL). Moreover, the clear signal CLR[L] (which generally comprises branch clear signals CLR1 to CLRL) can actuate switches S3-1 to S3-J and S4-1 to S4-J to discharge capacitors C1-1 to C1-J and C2-1 to C2-J, while the output switches S2-1 to S2-J and S6-1 to S6-J are actuated by the ADC clock signal ADCCLK[L] (which generally comprises branch readout signals ADCCLK1 to ADCCLKL).

Figure 31:
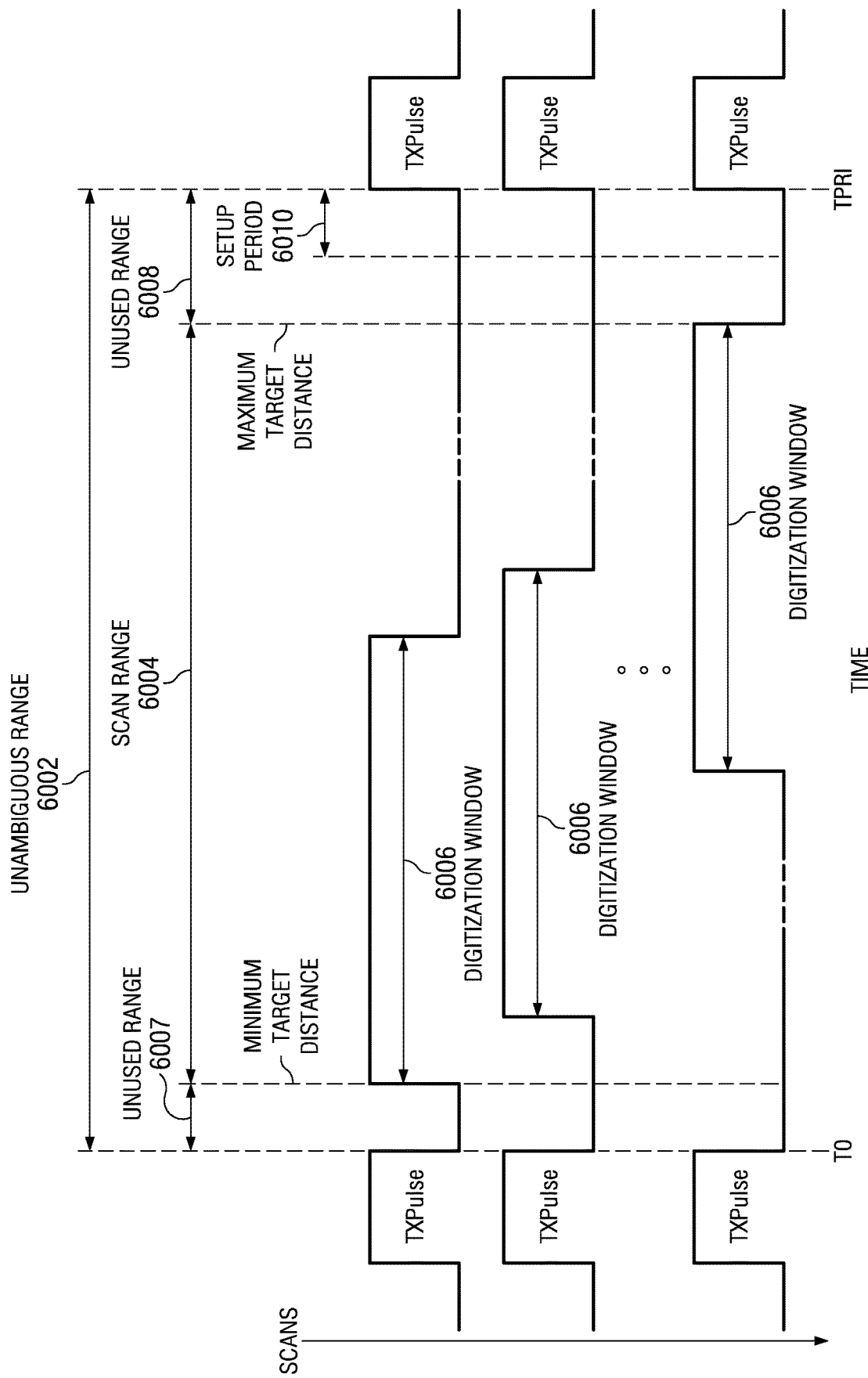
FIGS. 31 and 32 are diagrams demonstrating the operation of the system of FIG. 6.

FIG. 31 shows an example of the operation of the analog baseband circuit 2116 (and system 200). Usually, the controller 230 adjusts the phase shift for each of the transceivers 206-1 to 206-N (for this example) to direct a beam of terahertz radiation emitted from the phased array 204 so as to be aligned and optically coupled with the touch panel 102. This emitted radiation is in the form of a pulse that can be directed toward a the touch panel 102 so that reflected radiation (i.e., from the object 110) can be received by the transceivers 206-1 to 206-N. These transmitted pulses TXPulse can (for example) each a width of about 100 ps that would correspond to a distance of about 1.5 cm and can be separated from one another by at least an unambiguous range or duration 6002 (which allows ample time for reset and detection) between times T0 and TPRI (which is the pulse repetition interval). For example, this unambiguous range 6002 can be 9.9 ns or 1.485 m, which can correspond to a 100 MHz pulsing frequency. Within this unambiguous range 6002, there is a scan range 6004 between the minimum and maximum target distances and unused ranges 6007 and 6008. The minimum target distance is generally dictated by far field conditions and may be, for example, about 3 cm, while the maximum target distance is generally limited by the available power reflected by the target and sensitivity of the transceivers 204-1 to 204-N (which may be, for example, about 24 cm). The scan range 6004 can be divided into number of range cells (not shown in FIG. 31 for the sake of simplicity) that each have approximately the same width as the transmitted pulse TXPulse (i.e., 100 ps), and a set (i.e., 4) of the range cells can be arranged into a digitization window 6006, having a total width of (for example) about 400 ps. The digitization window 6006 allows for the reflected and received radiation to be digitized. Also, the setup period 6010 following the scan range 6004 can be used as setup time for analog transmission.

Figure 32:
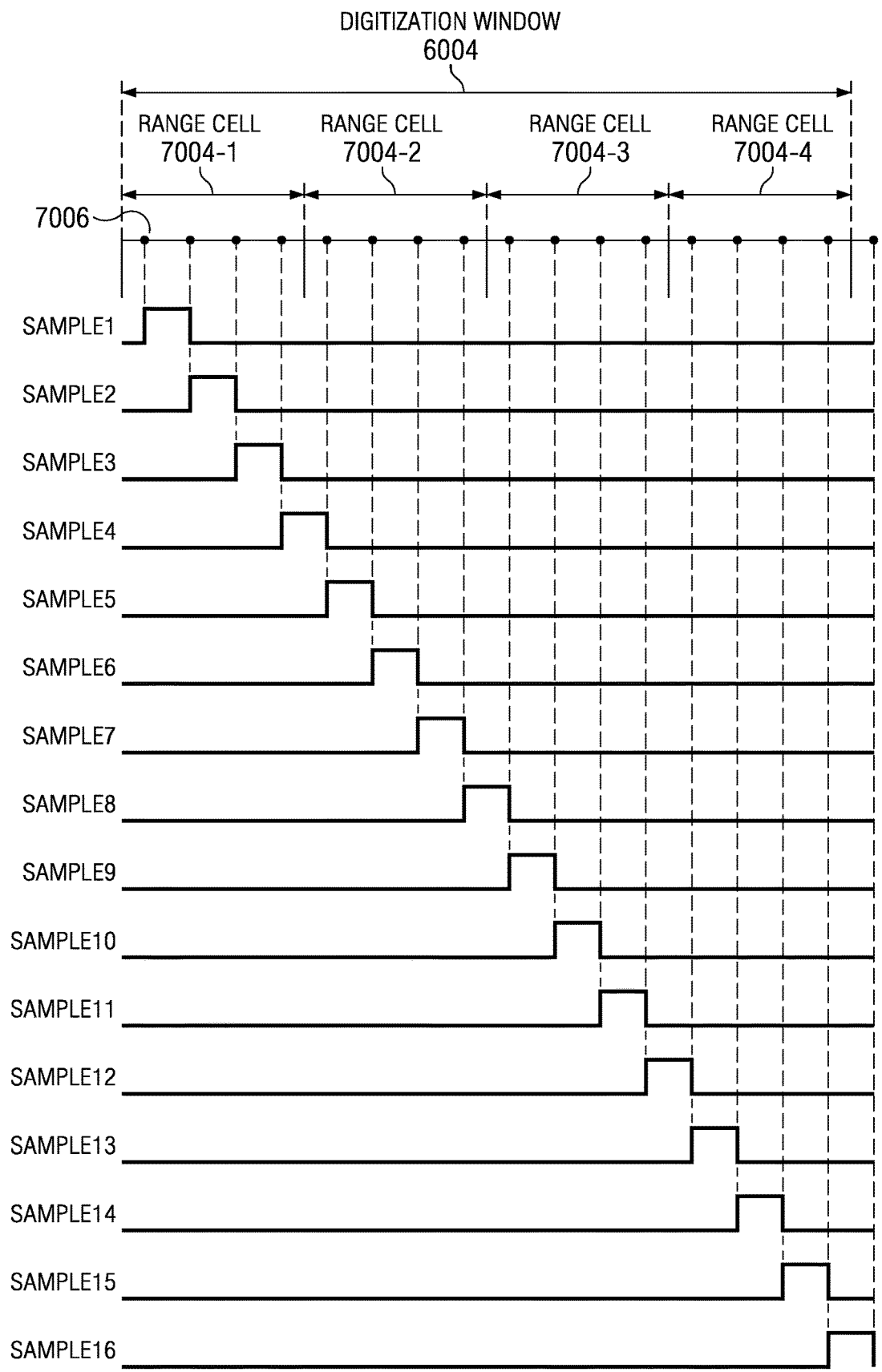

FIG. 32 shows the structure and operation of digitization window 6006 in greater detail. As described above, the digitization window 6006 is generally comprised of a set of range cells; in this example, there are four range cells 7004-1 to 7004-4 in window 6006. Each of the range cells 7004-1 to 7004-4 can then be subdivided into sampling instants (i.e., 7006). Again, in this example, there are four sampling instants per range cell 7004-1 to 7004-4 (with a total of 16). Since each sampling instant (i.e., 7006) is generally associated with a branch (i.e., 5002-1), it can be assumed for this example that there are four transceivers (i.e., 206-1 to 206-4), four switched capacitor banks (i.e., 4002-1 to 4002-4) with four branches each (i.e., 5002-1 to 5002-4), sixteen branch sample signals (i.e., SAMPLE1 to SAMPLE16), and sixteen dump branch signals (i.e., SAMPLE1 to SAMPLE16). Also, for example, the sampling instants (i.e., 608) can be separated from one another by 25 ps.

During digitization window 6006, averaging of the baseband signals BBI and BBQ is performed. The branch sample signals SAMPLE1 to SAMPLE16 (for the example of FIG. 32) are asserted on each successive sampling instant (i.e., 6008) within digitization window 6006 so as to actuate sample switches S1-1 to S1-4 and S5-1 to S5-4 for each branch 4002-1 to 4002-4. These branch sample signals SAMPLE1 to SAMPLE16, in this example, are asserted for substantially the same duration as each of sub-range cell or sampling period (i.e., time between sampling instants which can be about 25 ps). This process is then repeated over a predetermined number (i.e., 16) of transmitted pulses TXPulse (generally in consecutive cycles) such that the each capacitor C1-1 to C1-4 for each branch 4002-1 to 4002-4 measures the same sub-range cell or same sampling period during each of the repeated cycles. This allows the capacitors C1-1 to C1-4 for each branch 4002-1 to 4002-4 to "average" its amplified baseband signal (i.e., BBI or BBQ) for its sub-range cell or sampling period over the predetermined number of cycles. Following the completion of the predetermined number of cycles, the ADC clock signal ADCCLK[L] (which is generally synchronized with the sample signal SAMPLECLK[L]) can be asserted so as to actuate output switches S2-1 to S2-4 and S6-1 to S6-4 for each branch 4002-1 to 4002-4 in order so that ADCs 3008-1 and 3008-2 can readout and digitize the averaged voltages from each of capacitors C1-1 to C1-4 for each branch 4002-1 to 4002-4. Once the ADCs 3008-1 and 3008-2 readout the averaged voltages from each of capacitors C1-1 to C1-4 for each branch 4002-1 to 4002-4, the branch clear signals CLR1 to CLR16 are asserted so as to actuate clear switches S3-1 to S3-46 and S4-1 to S4-4 for each branch 4002-1 to 4002-4 to discharge capacitors C1-1 to C1-4 and C2-1 to C2-4 for each branch 4002-1 to 4002-4.

Accordingly, an example method includes transmitting a pulse of terahertz radiation through a touch panel formed of a dielectric material such that the pulse generates an evanescent field in a region adjacent to a touch surface of the touch panel; generating a reflected pulse from an object located within the region adjacent to the touch surface of the touch panel; and triangulating a position of the object on the touch surface of the touch panel, based at least in part on the reflected pulse.

In an example, triangulating the position comprises: receiving the reflected pulse by a first receiver and a second receiver that are separated from one another by a distance; and calculating the position of the object, based at least in part on a first elapsed time between transmission and reception at the first receiver, a second elapsed time between transmission and reception at the second receiver, and the distance.

Also, in an example, the reflected pulse comprises a first reflected pulse, and triangulating the position comprises: generating a second reflected pulse from a reflector included in the touch panel; receiving the first and second reflected pulses by a receiver; and calculating the position of the object, based at least in part on the first and second reflected pulses.

In a further example, the reflector is located along the periphery of the touch panel.

In another example, the pulse comprises a first pulse, and the reflected pulse comprises a first reflected pulse, and the first pulse is transmitted by a first transceiver, and the method further comprises: transmitting a second pulse of terahertz radiation through a touch panel by a second transceiver; and generating a second reflected pulse from an object located within the region adjacent to the touch surface of the touch panel.

In yet another example, triangulating the position comprises triangulating the location of the object on the touch surface of the touch panel from the first and second reflected pulses.

An example apparatus comprises a touch panel, formed of a dielectric material, to carry terahertz radiation and having a touch surface; and a touch controller optically coupled to touch panel. The touch controller transmits a pulse of terahertz radiation through the touch panel so as to generate an evanescent field in a region adjacent to the touch surface. Also, the touch controller receives a reflected pulse generated by an object located within the region. Further, the touch controller triangulates a position of the object on the touch surface, based at least in part on the reflected pulse.

In an example, the touch controller comprises: a signaling circuit to generate and receive terahertz radiation; and a control circuit coupled to the signal circuit.

Also, in an example, the signaling circuit comprises: a transceiver; a local oscillator coupled to the transceiver; and receiver circuitry coupled to the transceiver.

In a further example, the receiver circuitry comprises an analog baseband circuit that averages the combined signal for a plurality of sampling periods within a digitization window to generate a plurality of averaged signals and that converts the averaged signals to a digital signal.

In another example, the analog baseband circuit comprises: a clock circuit; a low noise amplifier (LNA) coupled to the summing circuit; an averager coupled to the LNA and the clock circuit; an analog-to-digital converter (ADC) coupled to the LNA and the clock circuit; and an output circuit coupled to the ADC.

In yet another example, the transmitter comprises: a transmitter coupled to the local oscillator; and a plurality of receivers that are spaced apart from one another and that are each coupled to the receiver circuitry.

In one example, the touch panel comprises a reflector.

An example method comprises transmitting a pulse of terahertz radiation through a touch panel formed of a dielectric material such that the pulse generates an evanescent field in a region adjacent to a touch surface of the touch panel; generating a plurality of reflected pulses, wherein a first reflected pulse is generated by an object located within the region adjacent to the touch surface of the touch panel; and triangulating a position of the object on the touch surface of the touch panel, based at least in part on the reflected pulses.

In an example, the object comprises a first object, and the position comprises a first position, and a second reflected pulse of the plurality of reflected pulses is generated by a second object located within the region adjacent to the touch surface of the touch panel and at a second location.

In a further example, triangulating the position comprises: receiving the reflected pulses by a first receiver and a second receiver that are separated from one another by a distance; and calculating the position of the object, based at least in part on the reflected pulses.

In another example, a third reflected pulse of the plurality of reflected pulses is generated by a reflector.

Modifications are possible in the described embodiments, and other embodiments are possible, within the scope of the claims.

What is claimed is:

1. A method comprising:
transmitting a pulse of terahertz radiation through a touch panel including a dielectric material, the pulse generating an evanescent field in a region proximate a touch surface of the touch panel, and the terahertz radiation having a frequency range between 0.1 terahertz and 10 terahertz;
receiving a reflected pulse, responsive to distortion of the evanescent field by an object therein;
generating an average signal based on the reflected pulse;
providing the average signal to an analog-to-digital converter; and
detecting a position of the object responsive to an output of the analog-to-digital converter, the output of the analog-to-digital converter based at least in part on the distortion of the evanescent field.

2. The method of claim 1, wherein detecting the position includes:
receiving the reflected pulse by a first receiver and a second receiver that are separated from one another by a distance; and
calculating the position based at least in part on a first elapsed time between transmission and reception at the first receiver, a second elapsed time between transmission and reception at the second receiver, and the distance.

3. The method of claim 1, wherein the reflected pulse is a first reflected pulse, and detecting the position includes:
generating a second reflected pulse from a reflector in the touch panel;
receiving the first and second reflected pulses by a receiver; and
calculating the position based at least in part on the first and second reflected pulses.

4. The method of claim 3, wherein the reflector is located along a periphery of the touch panel.

5. The method of claim 1, wherein the pulse is a first pulse, the reflected pulse is a first reflected pulse, the first pulse is transmitted by a first transceiver, and the method further comprises:
transmitting a second pulse of terahertz radiation through the touch panel by a second transceiver; and
generating a second reflected pulse from the object.

6. The method of claim 5, wherein detecting the position includes triangulating the position based at least in part on the first and second reflected pulses.

7. An apparatus comprising:
an analog-to-digital converter;
a touch panel including a dielectric material over a substrate, the dielectric material adapted to be coupled to an antenna, the touch panel configured to carry terahertz radiation and having a touch surface, and the terahertz radiation having a frequency range between 0.1 terahertz and 10 terahertz; and
a touch controller coupled to the analog-to-digital converter and to the touch panel, the touch controller configured to:
transmit a pulse of terahertz radiation through the touch panel and the antenna to generate an evanescent field in a region proximate the touch surface;
receive a reflected pulse, responsive to distortion of the evanescent field by an object therein;
generate an average signal based on the reflected pulse;
provide the average signal to the analog-to-digital converter; and
detect a position of the object responsive to an output of the analog-to-digital converter, the output of the analog-to-digital converter based at least in part on the distortion of the evanescent field.

8. The apparatus of claim 7, wherein the touch controller includes a signaling circuit configured to generate and receive terahertz radiation.

9. The apparatus of claim 8, wherein the signaling circuit includes:
a transceiver;
a local oscillator coupled to the transceiver; and
receiver circuitry coupled to the transceiver.

10. The apparatus of claim 9, wherein the receiver circuitry includes a low noise amplifier (LNA), a summing circuit, a mixer and an analog baseband circuit configured to generate the average signal for sampling periods within a digitization window and to convert the average signal to a digital signal.

11. The apparatus of claim 10, wherein the LNA is coupled to the summing circuit and to the analog-to-digital converter, the mixer is coupled to the summing circuit, and the analog baseband circuit includes:
a clock circuit coupled to the analog-to-digital converter;
an averager coupled to the mixer, the summing circuit, the LNA and the clock circuit; and
an output circuit coupled to the analog-to-digital converter.

12. The apparatus of claim 11, further comprising:
a transmitter coupled to the local oscillator; and
receivers spaced apart from one another and coupled to the receiver circuitry.

13. The apparatus of claim 12, wherein the touch panel includes a reflector.

14. The apparatus of claim 8, wherein the signaling circuit includes:
a local oscillator configured to generate frequency signals of an order of 40 gigahertz to 100 gigahertz;
transceivers in a phased array, the transceivers configured to phase-adjust with respect to one another to direct a beam of terahertz frequency radiation, responsive to a control signal; and
a distribution network configured to provide the frequency signals to the transceivers in phase.

15. A method comprising:
transmitting a pulse of terahertz radiation through a touch panel including formed of a dielectric material, the pulse generating an evanescent field in a region adjacent to a touch surface of the touch panel, and the terahertz radiation having a frequency range between 0.1 terahertz and 10 terahertz;
receiving a plurality of reflected pulses, including a first reflected pulse occurring responsive to an object (1) causing distortion of the evanescent field ;
generating an average signal based on the plurality of reflected pulses;
providing the average signal to an analog-to-digital converter; and
detecting a position of the object responsive to an output of the analog-to-digital converter, the output of the analog-to-digital converter based at least in part on the distortion of the evanescent field.

16. The method of claim 15, wherein the object is a first object, the position is a first position, and the second reflected pulse is generated by a second object within the region at a second position.

17. The method of claim 16, wherein detecting the position includes:
   receiving the reflected pulses by a first receiver and a second receiver separated from one another by a distance; and
   calculating the position based at least in part on the reflected pulses.

18. The method of claim 17, wherein a third reflected pulse of the reflected pulses is generated by a reflector.

19. The method of claim 18, wherein the reflector is located along a periphery of the touch panel.

* * * * *